United States Patent
Brady et al.

(10) Patent No.: US 11,660,909 B2
(45) Date of Patent: May 30, 2023

(54) TIRE RETAINING FEATURE FOR A BICYCLE RIM

(71) Applicant: SRAM, LLC, Chicago, IL (US)

(72) Inventors: Patrick Brady, Chicago, IL (US); Michael Hall, Speedway, IN (US); David Morse, Indianapolis, IN (US); Miguel Navarro Baeza, Chicago, IL (US)

(73) Assignee: SRAM, LLC, Chicago, IL (US)

( * ) Notice: Subject to any disclaimer, the term of this patent is extended or adjusted under 35 U.S.C. 154(b) by 234 days.

(21) Appl. No.: 16/710,976

(22) Filed: Dec. 11, 2019

(65) Prior Publication Data
US 2021/0178806 A1    Jun. 17, 2021

(51) Int. Cl.
*B60B 1/00*      (2006.01)
*B60B 21/10*    (2006.01)

(52) U.S. Cl.
CPC ............ *B60B 1/003* (2013.01); *B60B 21/102* (2013.01)

(58) Field of Classification Search
CPC ..... B60B 1/003; B60B 21/102; B60B 21/104; B60B 21/106; B60B 21/12; B60B 21/125
See application file for complete search history.

(56) References Cited

U.S. PATENT DOCUMENTS

| | | | |
|---|---|---|---|
| 3,965,957 A * | 6/1976 | Nakasaki | B60B 21/12 152/400 |
| 5,820,709 A * | 10/1998 | Matsuda | B60C 5/14 152/501 |
| 5,975,645 A | 11/1999 | Sargent | |
| 6,237,662 B1 * | 5/2001 | Thomasberg | B60B 1/003 152/379.4 |
| 6,932,371 B2 | 8/2005 | Perez | |
| 6,938,962 B1 | 9/2005 | Schlanger | |
| 7,114,785 B2 | 10/2006 | Ording et al. | |
| 7,883,157 B2 | 2/2011 | Theilig et al. | |
| 7,918,514 B2 | 4/2011 | Dal Pra' | |
| 7,934,778 B2 | 5/2011 | Denk et al. | |
| 8,002,362 B2 | 8/2011 | Colegrove et al. | |

(Continued)

FOREIGN PATENT DOCUMENTS

| | | | | |
|---|---|---|---|---|
| CN | 202294054 U | * | 7/2012 | ............. B60B 21/12 |
| DE | 202014103622 U1 | * | 8/2014 | ............. B60B 21/12 |
| KR | 101519736 B1 | * | 5/2015 | ........... B60B 21/104 |

OTHER PUBLICATIONS

Machine Translation of KR 101519736 B1, 5 pages (Year: 2015).*
Machine Translation of DE 202014103622 U1, 6 pages (Year: 2014).*

*Primary Examiner* — S. Joseph Morano
*Assistant Examiner* — Emily G. Castonguay

(57) ABSTRACT

A rim assembly for a bicycle wheel includes a rim, a first protruding tire retaining feature attached to a first surface of the rim, and a second protruding tire retaining feature attached to a second surface of the rim. The first surface is a surface of a first tire retaining wall of a radially outer tire engaging portion of the rim, and the second surface is a surface of a second tire retaining wall of the radially outer tire engaging portion. The second surface faces the first surface. The first protruding tire retaining feature and the second protruding tire retaining feature are made of a first material, and the first tire retaining wall and the second tire retaining wall are made of a second material. The second material is different than the first material.

20 Claims, 16 Drawing Sheets

(56) References Cited

U.S. PATENT DOCUMENTS

| | | |
|---|---|---|
| 8,342,614 B2 | 1/2013 | Poertner et al. |
| 8,708,424 B2 | 4/2014 | Mercat et al. |
| 8,757,733 B2 | 6/2014 | Smart |
| 8,905,491 B2 | 12/2014 | Koshiyama |
| 8,978,725 B2 | 3/2015 | Koshiyama et al. |
| 9,044,998 B2 | 6/2015 | Mercat et al. |
| 9,050,224 B2 | 6/2015 | Slorance |
| 9,216,613 B2 | 12/2015 | Poertner et al. |
| 9,283,804 B2 | 3/2016 | Schlanger |
| 9,283,815 B2 | 3/2016 | Watarai |
| 9,302,538 B2 | 4/2016 | Smart |
| 9,346,319 B2 | 5/2016 | Schiers |
| 9,662,934 B2 | 5/2017 | Birdseye |
| 9,718,305 B2 | 8/2017 | Kashimoto et al. |
| 9,770,940 B2 | 9/2017 | Kismarton et al. |
| 10,052,911 B2 | 8/2018 | Satterthwaite |
| 10,293,635 B2 | 5/2019 | Poertner et al. |
| 10,739,370 B2 | 8/2020 | Morton et al. |
| 10,919,346 B2 | 2/2021 | Jordan et al. |
| 2004/0021366 A1 | 2/2004 | Colegrove |
| 2007/0000589 A1 | 1/2007 | Mellet et al. |
| 2007/0209743 A1 | 9/2007 | Mellet |
| 2007/0222278 A1 | 9/2007 | Hoisington |
| 2007/0273197 A1 | 11/2007 | Smith |
| 2008/0174168 A1* | 7/2008 | Yang ............ B60B 21/062 301/95.102 |
| 2009/0058180 A1 | 3/2009 | Poertner et al. |
| 2009/0236902 A1 | 9/2009 | Zibkoff |
| 2009/0250995 A1 | 10/2009 | Tsai |
| 2010/0253132 A1 | 10/2010 | Schlanger |
| 2011/0084543 A1 | 4/2011 | Lew |
| 2011/0089751 A1 | 4/2011 | Saillet |
| 2011/0115280 A1 | 5/2011 | Mercat et al. |
| 2011/0248552 A1 | 10/2011 | Koshiyama et al. |
| 2012/0049610 A1 | 3/2012 | Lew |
| 2012/0056468 A1 | 3/2012 | Tsai |
| 2012/0074763 A1 | 3/2012 | Chan |
| 2012/0103495 A1 | 5/2012 | Mercat et al. |
| 2012/0205965 A1 | 8/2012 | Kuan et al. |
| 2012/0212036 A1 | 8/2012 | Goto |
| 2013/0043713 A1 | 2/2013 | Schlanger |
| 2013/0043717 A1 | 2/2013 | Poertner et al. |
| 2013/0180641 A1 | 7/2013 | French |
| 2014/0042798 A1 | 2/2014 | Iwai et al. |
| 2014/0117745 A1 | 5/2014 | Wilke et al. |
| 2014/0152080 A1 | 6/2014 | Koshiyama |
| 2014/0175859 A1 | 6/2014 | Koshiyama |
| 2014/0292061 A1 | 10/2014 | Lew |
| 2015/0028660 A1 | 1/2015 | Mercat |
| 2015/0144239 A1 | 5/2015 | Hiscock |
| 2015/0165845 A1 | 6/2015 | Poertner |
| 2015/0360510 A1 | 12/2015 | Poertner et al. |
| 2016/0144660 A1 | 5/2016 | Mercat et al. |
| 2016/0159141 A1 | 6/2016 | Satterthwaite et al. |
| 2016/0243732 A1 | 8/2016 | Wissler et al. |
| 2016/0263938 A1 | 9/2016 | Lew |
| 2017/0072738 A1 | 3/2017 | Shiotani et al. |
| 2017/0080749 A1 | 3/2017 | Scruggs |
| 2017/0087929 A1* | 3/2017 | Walls-Bruck ......... B60B 21/028 |
| 2017/0232790 A1 | 8/2017 | Hall et al. |
| 2018/0117958 A1 | 5/2018 | Macris et al. |
| 2019/0001765 A1 | 1/2019 | Jordan et al. |
| 2019/0105807 A1 | 4/2019 | Feltrin |
| 2019/0105944 A1 | 4/2019 | Meggiolan |
| 2019/0299704 A1 | 10/2019 | Fabris |
| 2019/0308446 A1 | 10/2019 | Morse et al. |
| 2020/0114679 A1 | 4/2020 | Morse et al. |
| 2020/0122502 A1 | 4/2020 | Trouw et al. |
| 2020/0298618 A1 | 9/2020 | Yokozawa et al. |
| 2020/0331291 A1 | 10/2020 | Child et al. |
| 2020/0369081 A1 | 11/2020 | D'Armancourt et al. |
| 2021/0178811 A1 | 6/2021 | Hed et al. |

\* cited by examiner

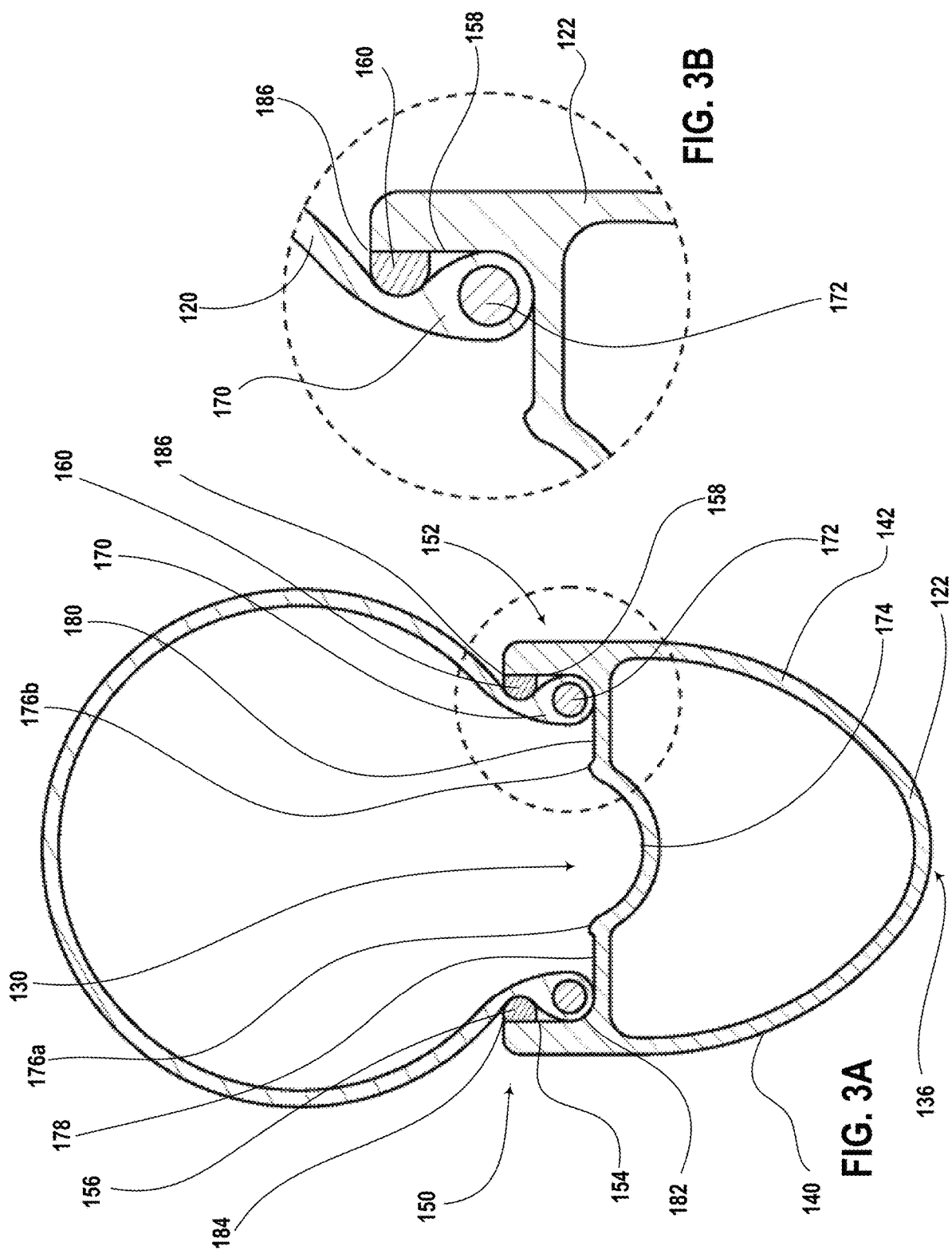

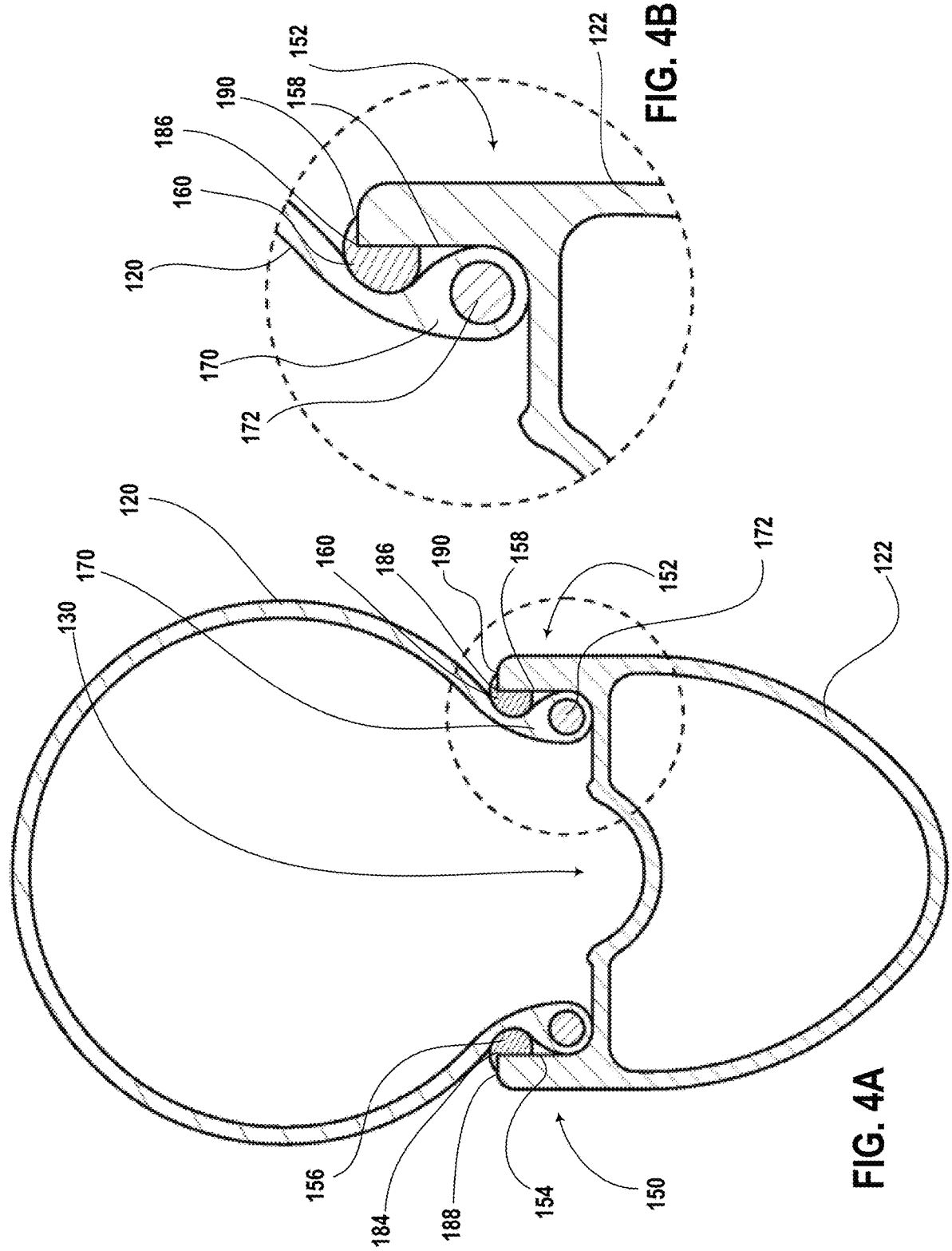

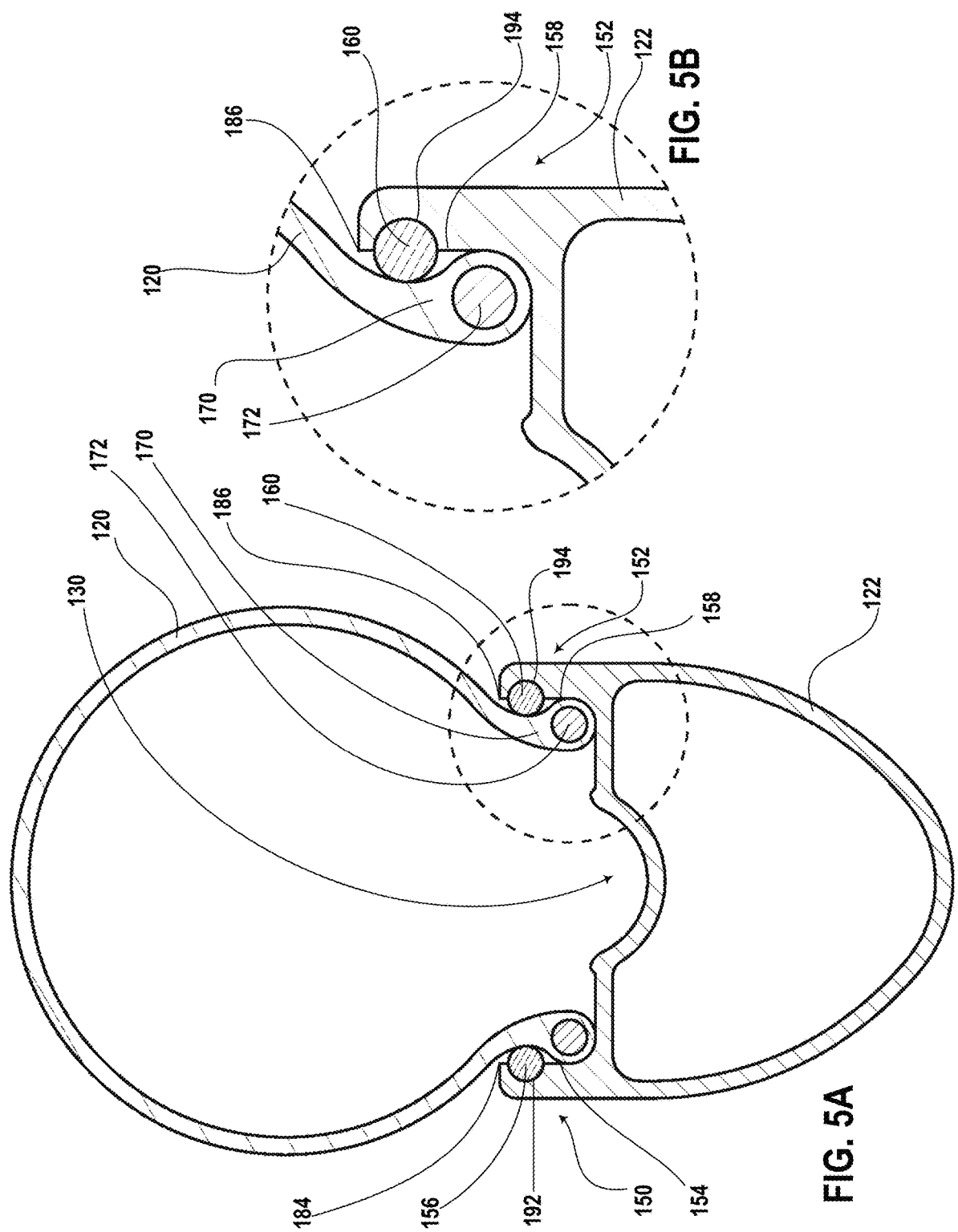

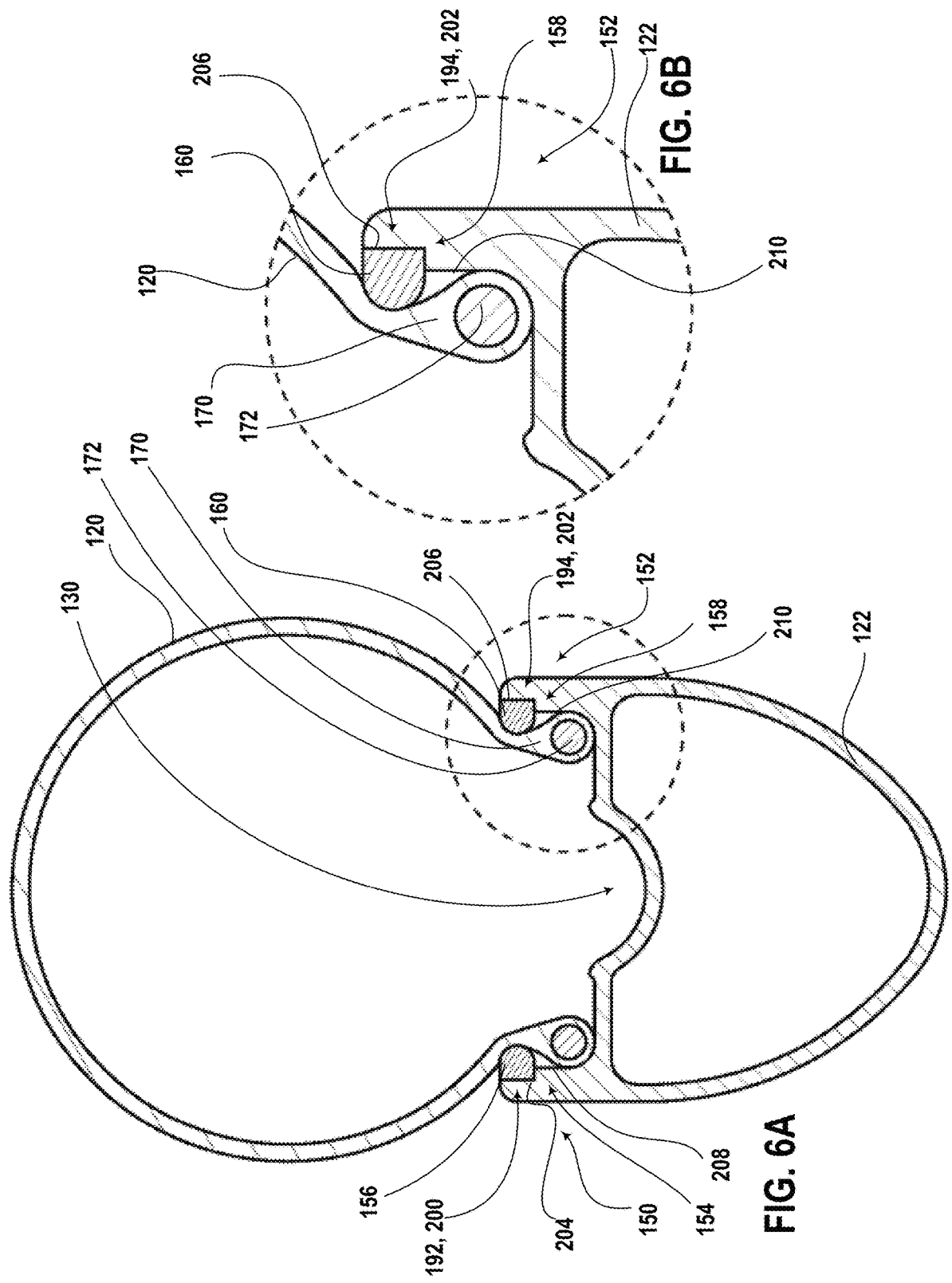

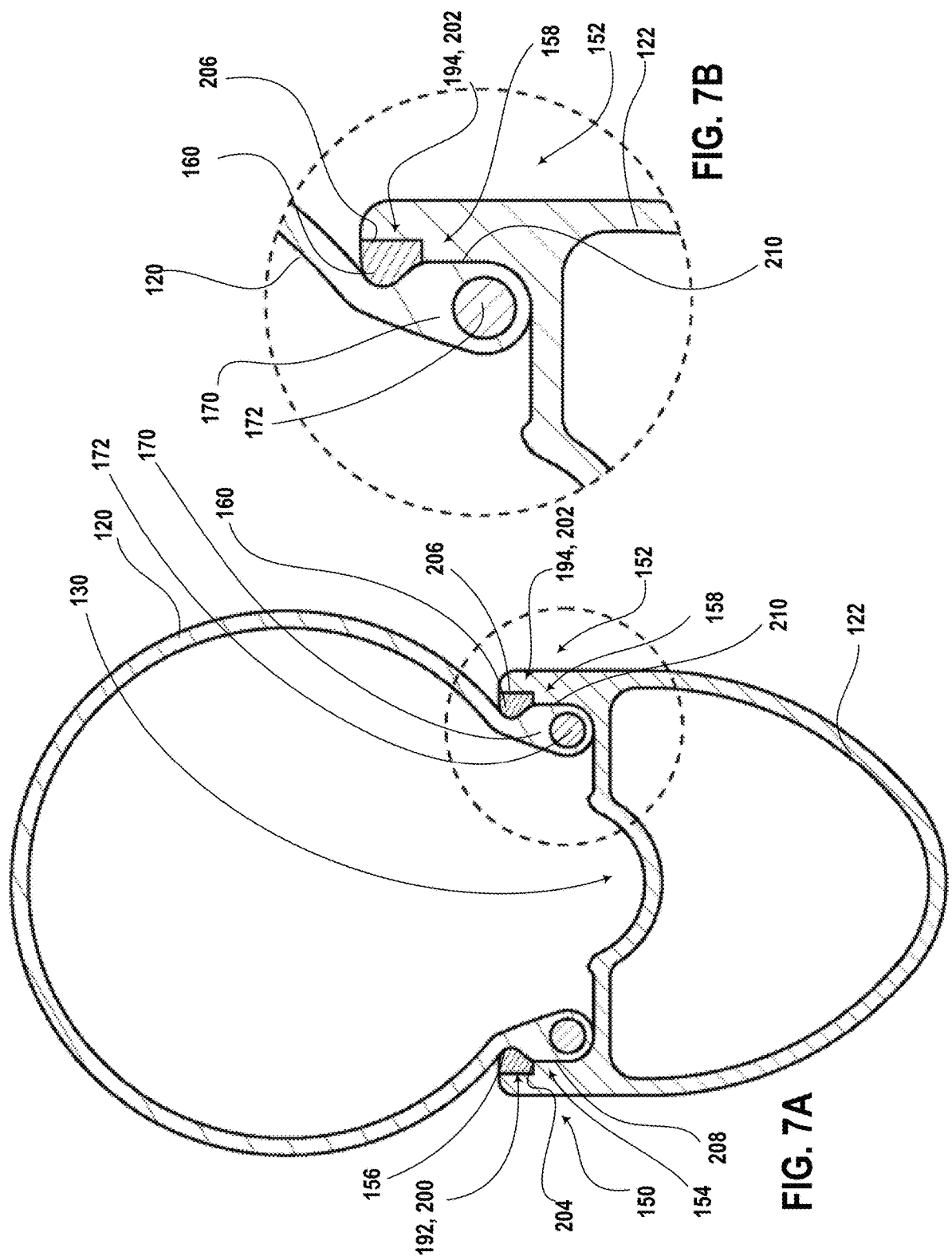

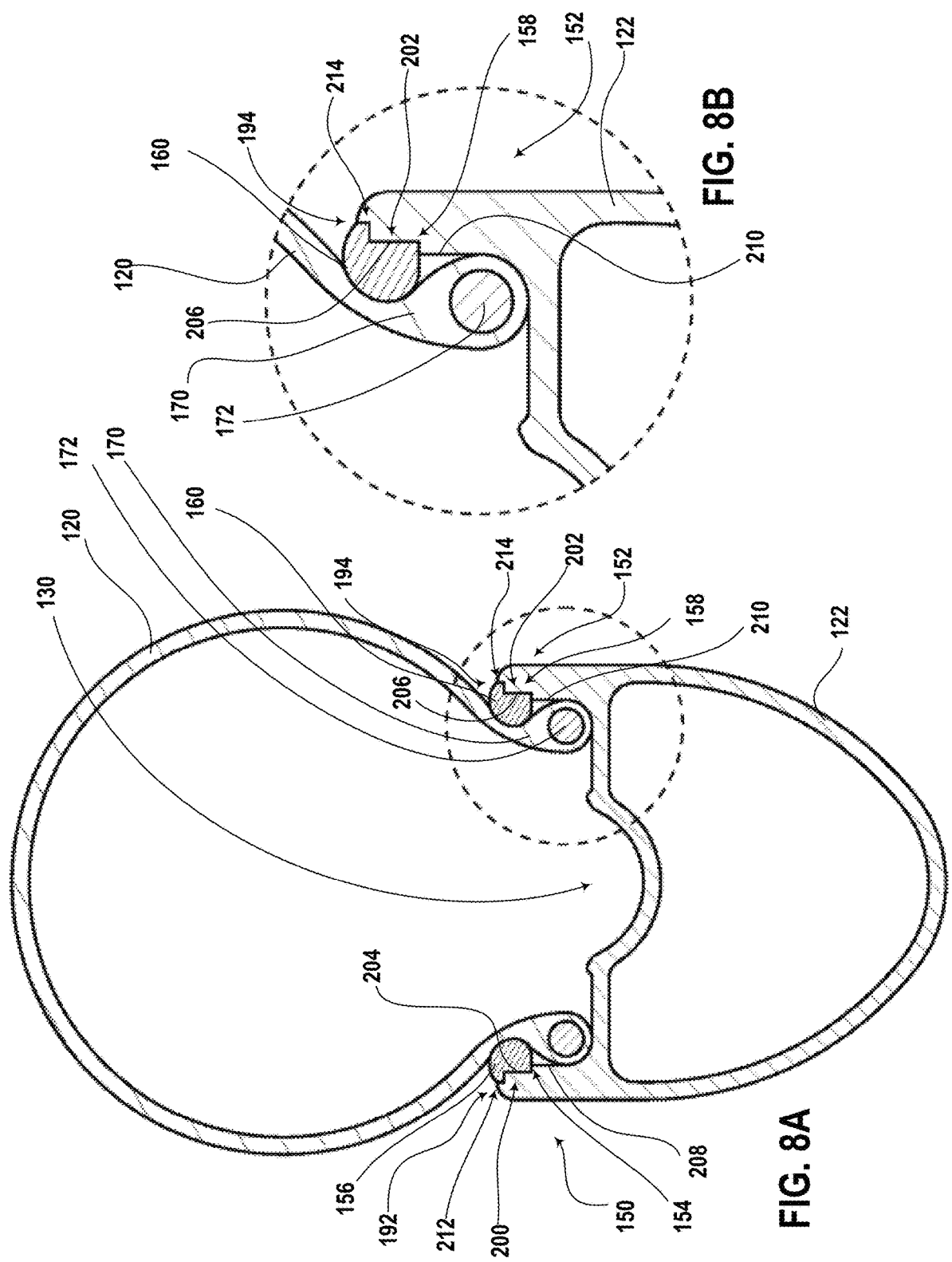

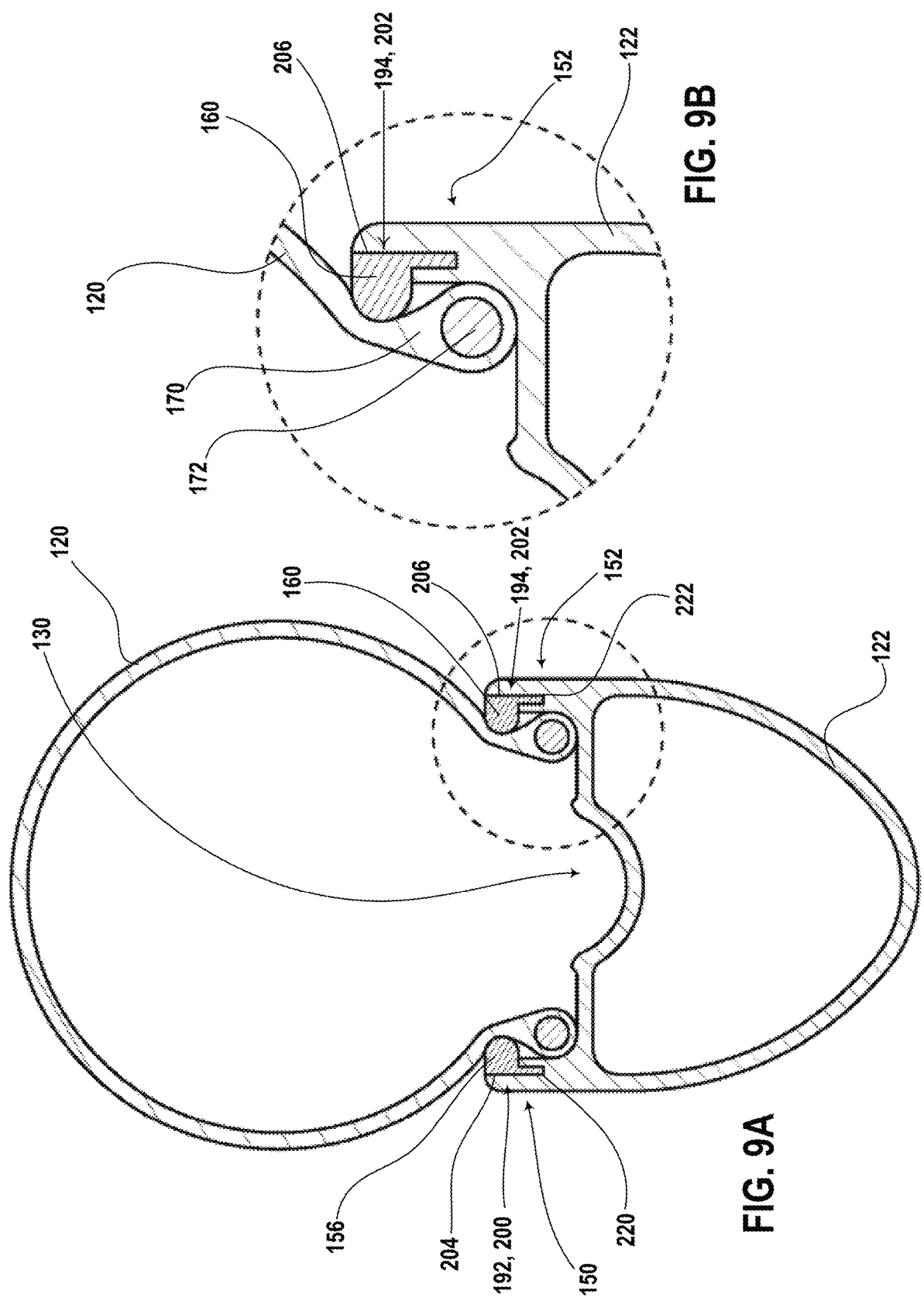

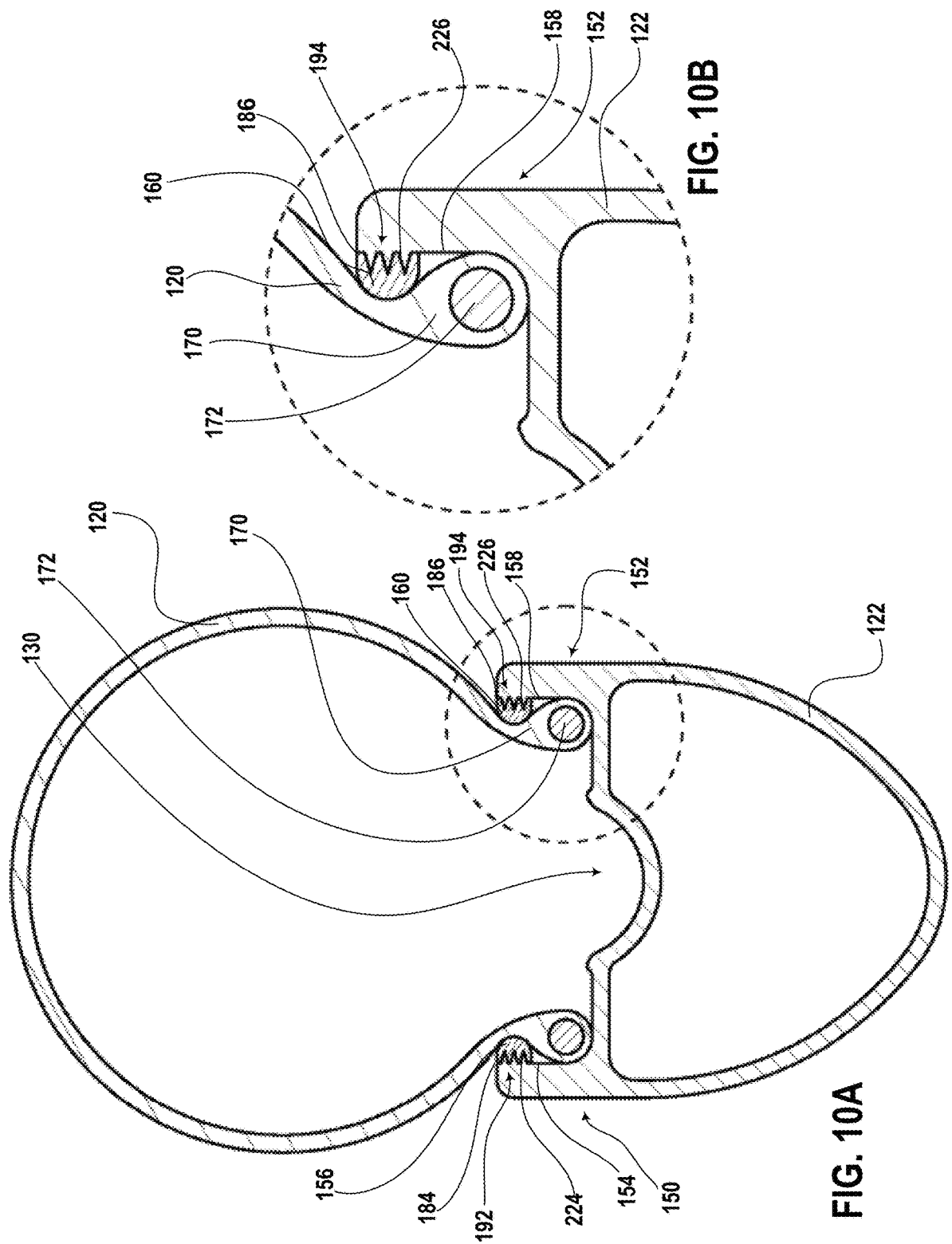

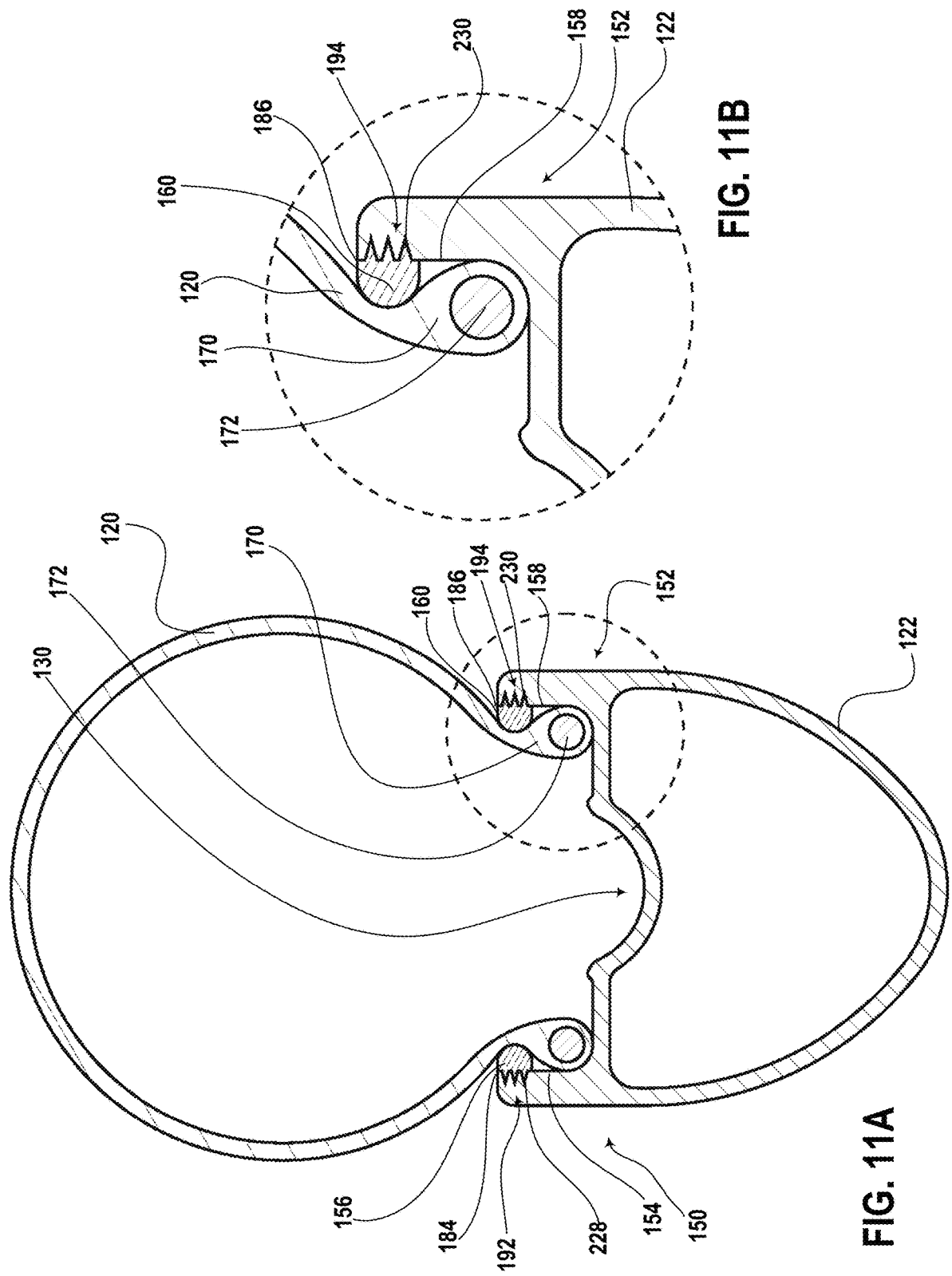

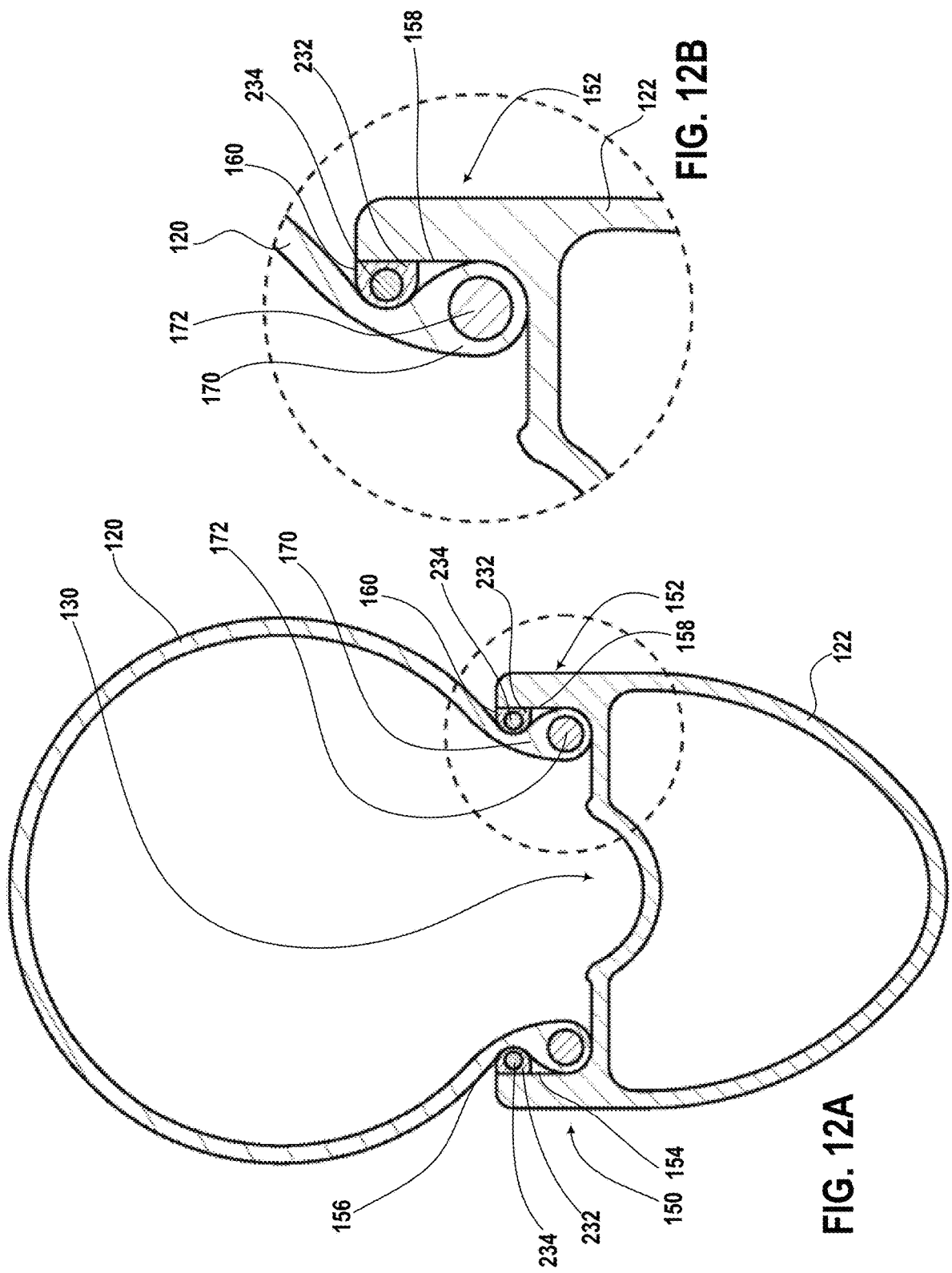

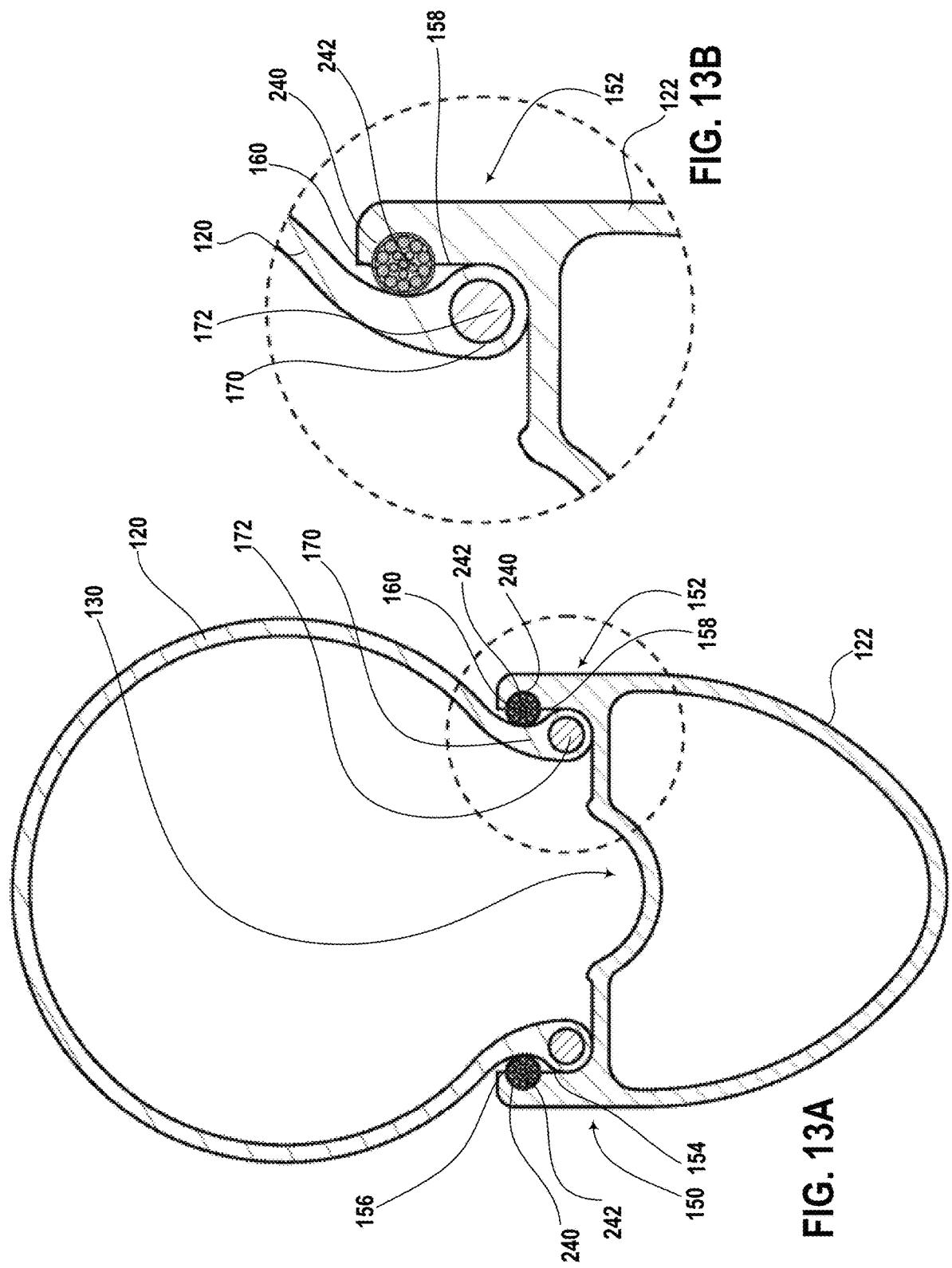

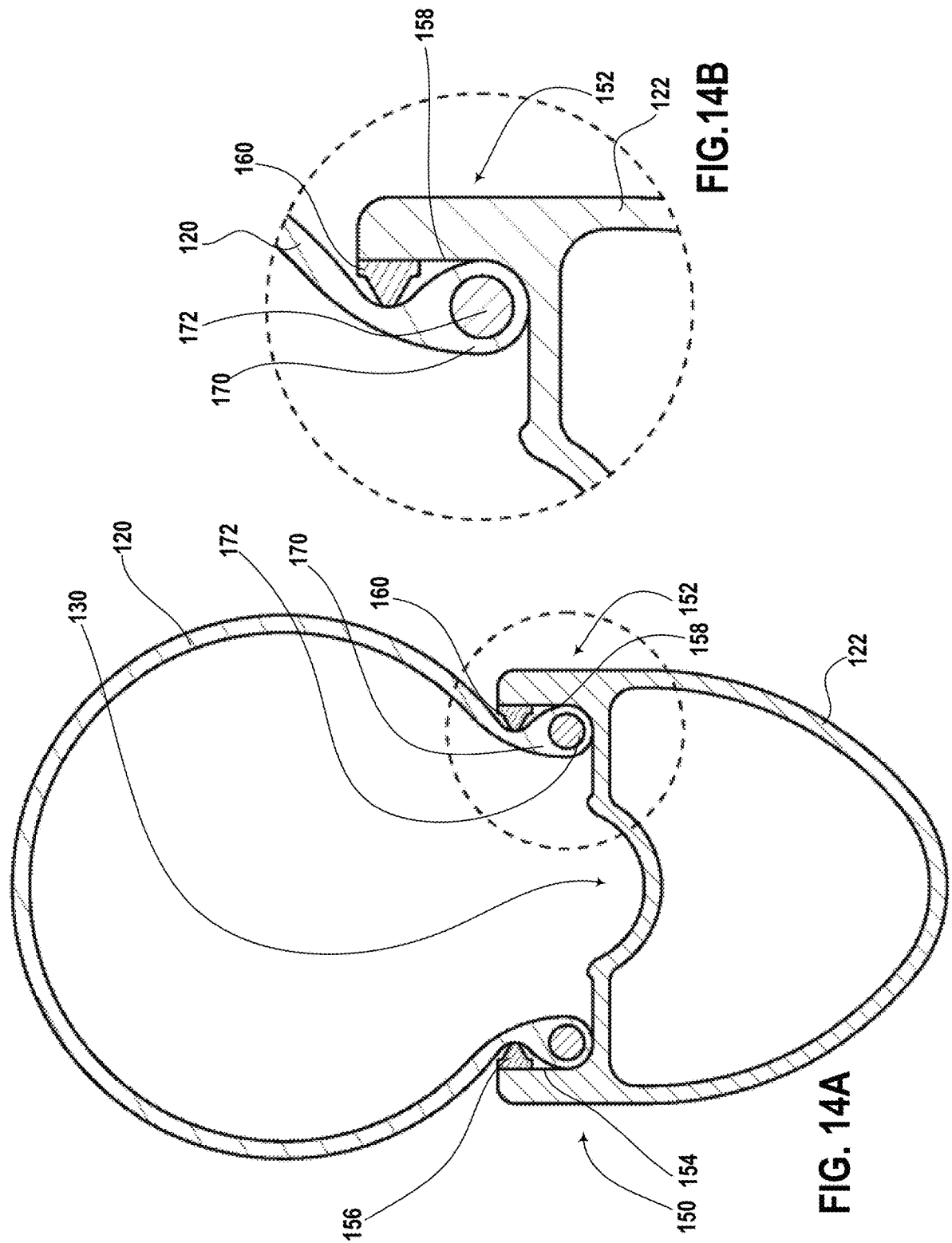

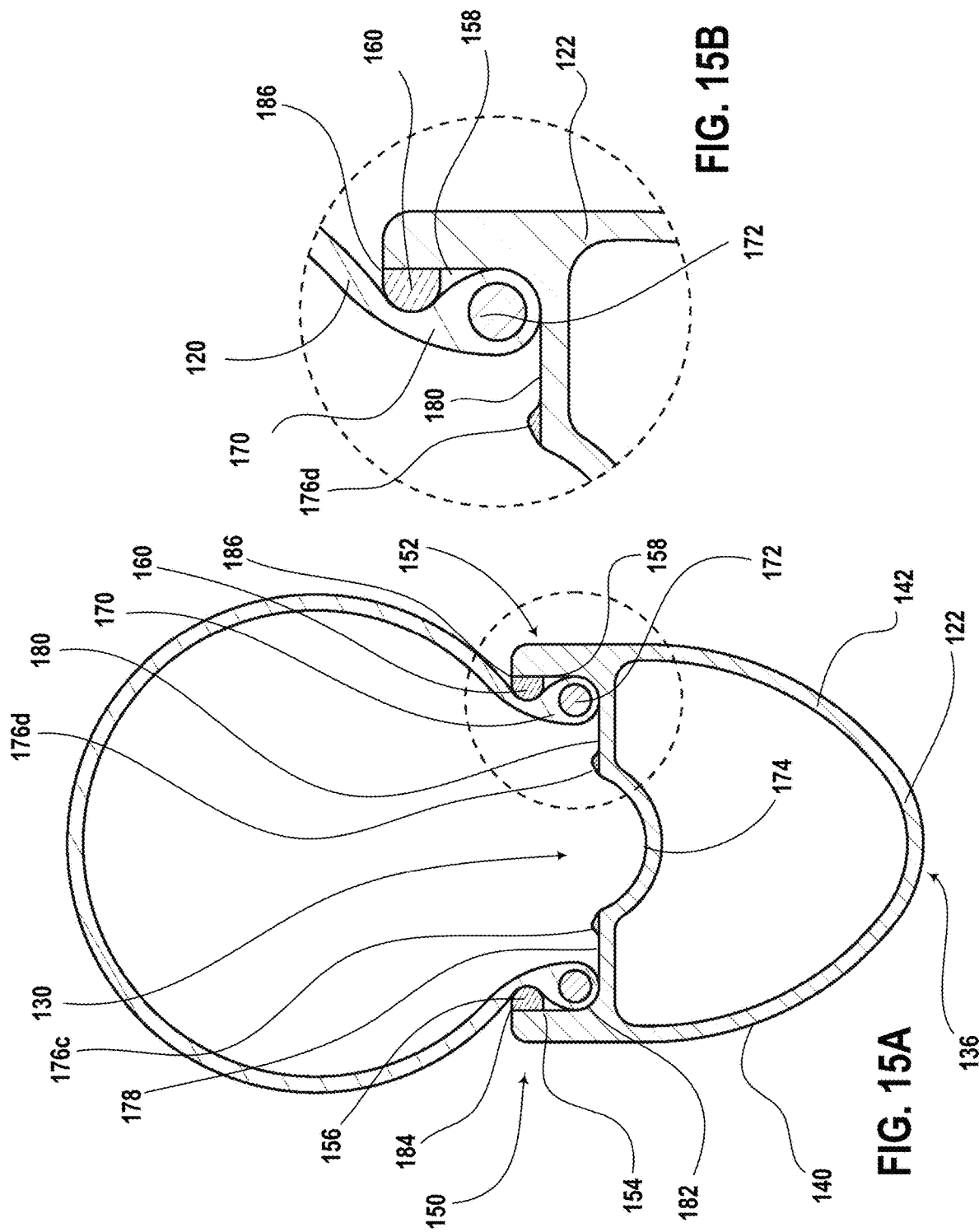

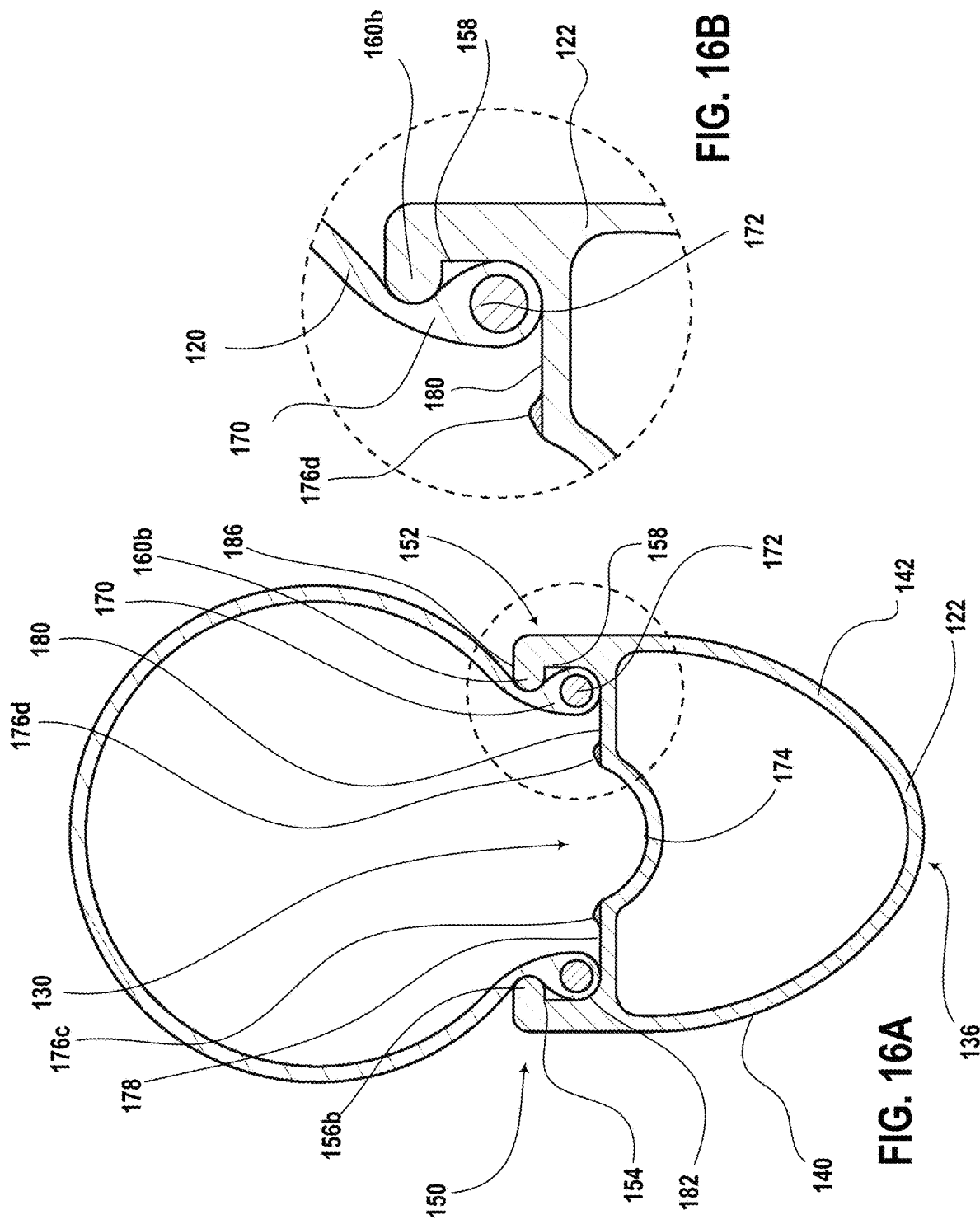

TIRE RETAINING FEATURE FOR A BICYCLE RIM

BACKGROUND

1. Field of the Disclosure

The present disclosure is generally directed to a clincher rim for a bicycle, and more particularly, to a tire retaining feature of the clincher rim.

2. Description of Related Art

A traditional bicycle wheel may include a rim formed of extruded metals or other materials that are bent and bonded into a circular shape having consistently shaped cross sections. Recently, other materials, such as carbon fiber reinforced plastics, have been used in the manufacture of bicycle rims, which may be formed into circular shapes through non-extrusion based processes. Carbon fiber reinforced plastics may, for example, be used.

The rim may be configured for the attachment of any number of different types of tires. For example, the rim may be configured for attachment of a tubeless clincher tire. The tubeless clincher tire includes beads that interact with a tire engaging portion of the rim to attach the tubeless clincher tire to and maintain the tubeless clincher tire on the rim. The tire engaging portion may include protrusions in the shape of, for example, hooks that help maintain the tubeless clincher tire on the rim.

Traditionally, the hooks of road bicycle clincher rims made of carbon fiber are manufactured by extracting material from a tire bed of the rim with a mandrel, which provides a specific hook geometry for maintaining the tubeless clincher tire on the rim. At particular tire pressures, however, air may leak from the tire and/or the hooks may fail to maintain the tubeless clincher tire on the rim.

SUMMARY

In one example, a rim assembly for a bicycle wheel includes a rim. The rim includes a radially inner portion disposed along an inner circumference of the rim, a first sidewall, a second sidewall spaced apart from the first sidewall, and a radially outer tire engaging portion disposed along an outer circumference of the rim. The first sidewall and the second sidewall extend radially outward from the radially inner portion. The radially outer tire engaging portion has a first tire retaining portion and a second tire retaining portion spaced apart from the first tire retaining portion. The first tire retaining portion extends from the first sidewall, and the second tire retaining portion extends from the second sidewall. The first tire retaining portion includes a first tire retaining wall, and the second tire retaining portion includes a second tire retaining wall opposite the first tire retaining wall. The rim assembly also includes a first protruding tire retaining feature attached to a first surface of the rim, and a second protruding tire retaining feature attached to a second surface of the rim. The first surface is a surface of the first tire retaining wall, and the second surface is a surface of the second tire retaining wall. The second surface faces the first surface. The first protruding tire retaining feature and the second protruding tire retaining feature are made of a first material, and the first tire retaining wall and the second tire retaining wall are made of a second material. The second material is different than the first material.

In one example, the first material has a lower hardness than the second material.

In one example, the first material is an epoxy adhesive, silicone, rubber, a gel, a filament, or a fiber. The second material is aluminum, titanium, or a fiber reinforced plastic.

In one example, the first protruding tire retaining feature and the second protruding tire retaining feature are respectively attached to the first surface and the second surface with an adhesive.

In one example, the first protruding tire retaining feature is attached to the first surface at a radially outer edge of the first tire retaining wall, and the second protruding tire retaining feature is attached to the second surface at a radially outer edge of the second tire retaining wall.

In one example, the first protruding tire retaining feature is attached to the first surface at a position spaced apart from a radially outer edge of the first tire retaining wall, and the second protruding tire retaining feature is attached to the second surface at a position spaced apart from a radially outer edge of the second tire retaining wall.

In one example, the first tire retaining wall includes a first attachment feature, and the second tire retaining wall includes a second attachment feature.

In one example, the first attachment feature includes a first groove that extends from the first surface into the first tire retaining wall and extends around the rim. The first groove is spaced apart from a radially outer edge of the first tire retaining wall. The second attachment feature includes a second groove that extends from the second surface into the second tire retaining wall and extends around the rim. The second groove is spaced apart from a radially outer edge of the second retaining wall. The first protruding tire retaining feature is disposed within the first groove, and the second protruding tire retaining feature is disposed within the second groove.

In one example, the first attachment feature includes a first recessed portion of the rim. The first recessed portion includes the first surface. The first surface is laterally outer relative to a third surface of the rim. The third surface is another surface of the first tire retaining wall. A depth of the first recessed portion is defined by a distance between the first surface and the third surface. The second attachment feature includes a second recessed portion of the rim. The second recessed portion includes the second surface. The second surface is laterally outer relative to a fourth surface of the rim. The fourth surface is another surface of the second tire retaining wall. A depth of the second recessed portion is defined by a distance between the second surface and the fourth surface.

In one example, the first protruding tire retaining feature extends away from the first surface and beyond the third surface. The second protruding tire retaining feature extends away from the second surface and beyond the fourth surface.

In one example, the first attachment feature includes a third recessed portion of the rim. The third recessed portion is laterally outer relative to the first surface. The second attachment feature includes a fourth recessed portion of the rim. The fourth recessed portion is laterally outer relative to the second surface. The first protruding tire retaining feature is also attached to the first tire retaining wall at the third recessed portion, and the second protruding tire retaining feature is also attached to the second tire retaining wall at the fourth recessed portion.

In one example, the first attachment feature includes a plurality of first projections extending away from the first surface, and the second attachment feature includes a plurality of second projections extending away from the second surface, or the first attachment feature includes a plurality of first grooves extending from the first surface into the first tire retaining wall, and the second attachment feature includes a plurality of second grooves extending from the second surface into the second tire retaining wall.

In one example, the first protruding tire retaining feature is attached to the first surface at the plurality of first projections or the plurality of first grooves, and the second protruding tire retaining feature is attached to the second surface at the plurality of second projections or the plurality of second grooves.

In one example, the first protruding tire retaining feature is also attached to a radially outermost surface of the first tire retaining portion, and the second protruding tire retaining feature is also attached to a radially outermost surface of the second tire retaining portion.

In one example, the first protruding tire retaining feature and the second protruding tire retaining feature are also made of a third material. The third material is different than the first material. The first material surrounds the third material.

In one example, at least part of the first tire retaining wall and at least part of the second tire retaining wall are exposed wall surfaces, respectively.

In one example, a wheel for a bicycle includes a central hub configured for rotational attachment to the bicycle, a plurality of spokes attached to the central hub and extending radially outward from the hub, and a rim. The plurality of spokes consist of a number of spokes. The rim includes a radially outer tire engaging portion having a first tire retaining portion and a second tire retaining portion spaced apart from the first tire retaining portion. The first tire retaining portion includes a first tire retaining wall, and the second tire retaining portion includes a second tire retaining wall opposite the first tire retaining wall. The rim also includes a first sidewall, from which the first tire retaining portion extends, and a second sidewall, from which the second tire retaining portion extends. The second sidewall is spaced apart from the first sidewall. The first sidewall and the second sidewall extend radially inward of the radially outer tire engaging portion. The rim includes a radially inner portion disposed along an inner circumference of the rim. The plurality of spokes are attached to the radially inner portion of the rim. The first sidewall and the second sidewall extend radially outward from the radially inner portion. The also includes a first protruding tire retaining feature attached to a first surface of the rim, and a second protruding tire retaining feature attached to a second surface of the rim. The first surface is a surface of the first tire retaining wall. The second surface is a surface of the second tire retaining wall and faces the first surface. The first protruding tire retaining feature and the second protruding tire retaining feature are made of a first material, and the first tire retaining wall and the second tire retaining wall are made of a second material.

In one example, the first material has a lower hardness than the second material.

In one example, the first tire retaining wall includes a first attachment feature, and the second tire retaining wall includes a second attachment feature. The first attachment feature includes a first recessed portion of the rim. The first recessed portion includes the first surface. The first surface is laterally outer relative to a third surface of the rim. The third surface is another surface of the first tire retaining wall. A depth of the first recessed portion is defined by a distance between the first surface and the third surface. The second attachment feature includes a second recessed portion of the rim. The second recessed portion includes the second surface. The second surface is laterally outer relative to a fourth surface of the rim. The fourth surface is another surface of the second tire retaining wall. A depth of the second recessed portion is defined by a distance between the second surface and the fourth surface.

In one example, a rim includes a radially inner portion disposed along an inner circumference of the rim, a first sidewall, and a second sidewall spaced apart from the first sidewall. The first sidewall and the second sidewall extend radially outward from the radially inner portion. The rim also includes a radially outer tire engaging portion disposed along an outer circumference of the rim. The radially outer tire engaging portion has a first tire retaining portion and a second tire retaining portion spaced apart from the first tire retaining portion. The first tire retaining portion extends from the first sidewall, and the second tire retaining portion extends from the second sidewall. The first tire retaining portion includes a first tire retaining wall, and the second tire retaining portion includes a second tire retaining wall opposite the first tire retaining wall. The rim includes a first protruding tire retaining feature attached to a portion of a surface of the first tire retaining wall, and a second protruding tire retaining feature attached to a portion of a surface of the second tire retaining wall. The surface of the second tire retaining wall faces the surface of the first tire retaining wall.

BRIEF DESCRIPTION OF THE DRAWINGS

Objects, features, and advantages of the present invention will become apparent upon reading the following description in conjunction with the drawing figures, in which:

FIG. 3A is a cross-section view of a first example of a rim, with a tire attached, taken along axis 3 of the wheel of FIG. 2;

FIG. 3B is a close-up cross-section view of a portion of the rim and the tire of FIG. 3A;

FIG. 4A is a cross-section view of a second example of a rim, with a tire attached;

FIG. 4B is a close-up cross-section view of a portion of the rim and the tire of FIG. 4A;

FIG. 5A is a cross-section view of a third example of a rim, with a tire attached;

FIG. 5B is a close-up cross-section view of a portion of the rim and the tire of FIG. 5A;

FIG. 6A is a cross-section view of a fourth example of a rim, with a tire attached;

FIG. 6B is a close-up cross-section view of a portion of the rim and the tire of FIG. 6A;

FIG. 7A is a cross-section view of a fifth example of a rim, with a tire attached;

FIG. 7B is a close-up cross-section view of a portion of the rim and the tire of FIG. 7A;

FIG. 8A is a cross-section view of a sixth example of a rim, with a tire attached;

FIG. 8B is a close-up cross-section view of a portion of the rim and the tire of FIG. 8A;

FIG. 9A is a cross-section view of a seventh example of a rim, with a tire attached;

FIG. 9B is a close-up cross-section view of a portion of the rim and the tire of FIG. 9A;

FIG. 10A is a cross-section view of an eighth example of a rim, with a tire attached;

FIG. 10B is a close-up cross-section view of a portion of the rim and the tire of FIG. 10A;

FIG. 11A is a cross-section view of a ninth example of a rim, with a tire attached;

FIG. 11B is a close-up cross-section view of a portion of the rim and the tire of FIG. 11A;

FIG. 12A is a cross-section view of a tenth example of a rim, with a tire attached;

FIG. 12B is a close-up cross-section view of a portion of the rim and the tire of FIG. 12A;

FIG. 13A is a cross-section view of an eleventh example of a rim, with a tire attached;

FIG. 13B is a close-up cross-section view of a portion of the rim and the tire of FIG. 13A;

FIG. 14A is a cross-section view of a twelfth example of a rim, with a tire attached; and FIG. 14B is a close-up cross-section view of a portion of the rim and the tire of FIG. 14A.

FIG. 15A is a cross-section view of a thirteenth example of a rim, with a tire attached; and FIG. 15B is a close-up cross-section view of a portion of the rim and the tire of FIG. 15A.

FIG. 16A is a cross-section view of a thirteenth example of a rim, with a tire attached; and FIG. 16B is a close-up cross-section view of a portion of the rim and the tire of FIG. 16A.

DETAILED DESCRIPTION OF THE DISCLOSURE

Figure 1:
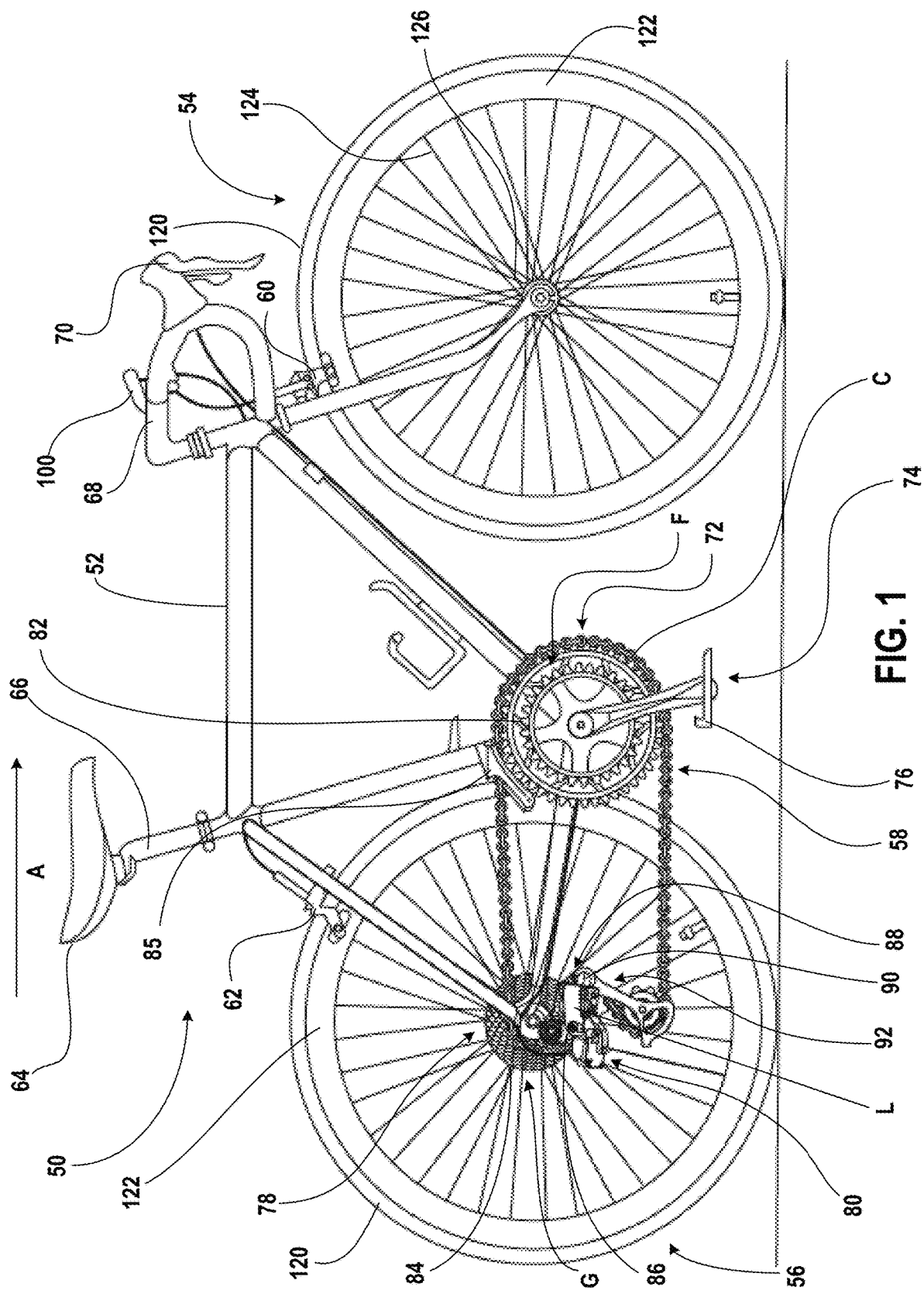
FIG. 1 is a side view schematic of a bicycle that may be constructed to utilize a rim in accordance with the teachings of this disclosure.

In the prior art, carbon fiber hooks manufactured by extracting material from the rim may fail to maintain a tubeless clincher tire on the rim at particular tire pressures. Road bicycle clincher rims of the prior art include hooks but may not be designed to provide a specific tire retaining strength or a specific hardness for the hooks.

The present disclosure provides examples of rims and wheels that solve or improve upon one or more of the above-noted and/or other disadvantages with prior known rims and wheels. The disclosed rims may include tire retaining features attached to the tire engaging portion. For example, the disclosed rims may include tire retaining features attached to tire retaining walls of the tire engaging portion, respectively.

The tire retaining features may be made of a compliant material. In one example, a viscous material is deposited on the tire retaining walls, and the viscous material is cured, such that the tire retaining features solidify and remain adhered to the tire retaining walls, respectively. Alternatively or additionally, the tire retaining features may be respectively attached to the tire retaining walls with an adhesive.

The tire engaging portion may include attachment features that improve a bonding efficacy of the tire retaining features. The attachment features may protrude from or penetrate into the tire engaging portion in a number of directions. Considering a plane of a respective tire retaining wall, the respective attachment feature may be positioned in a laterally inner portion or in a laterally outer portion of a plane of the respective tire retaining wall. Alternatively or additionally, considering a radial plane of the tire engaging portion, the attachment features may be positioned in a radially inner portion of the tire engaging portion or in a radially outer portion of the tire engaging portion relative to the radial plane. Alternatively or additionally, the attachment features may be positioned at a radial distance from a clincher shelf. The attachment features and the tire retaining wall may be mechanically or chemically treated for improving the bonding efficacy of the tire retaining features.

A significant advantage of the disclosed rims is that the tire retaining features may be configured based on the bicycle on which the rims are to be installed. For example, characteristics of the tire retaining features such as, for example, tire retaining strength and hardness may be configured for a particular tire pressure to be used. Other advantages of the disclosed rims are that the cost of manufacturing the tire retaining features, compared to the hooks of the prior art, is reduced, lead times may be reduced, the manufacturing process may be reduced, and scrap material derived from manufacturing the rims may be reduced. If a resilient material is used for manufacturing the tire retaining features, tubeless tire sealing may be made easier, and air retention may be improved. The compliant material may also dissipate vibrations when transmitted from the tire to the rim. Further, if a tire retaining feature is damaged, the tire retaining feature may be easily replaced.

Turning now to the drawings, FIG. 1 illustrates a first type of bicycle, such as a road bicycle. While the bicycle 50 depicted in FIG. 1 is a road bicycle (e.g., with mechanical (cable, hydraulic, and/or pneumatic) or non-mechanical (wired and/or wireless) drive systems), the rims, including the specific embodiments and examples disclosed herein as well as alternative embodiments and examples, may be implemented on other types of vehicles or bicycles. For example, the disclosed rims may be used on other types of two-, three-, and four-wheeled human powered vehicles such as, for example, a mountain bicycle (e.g., with full or partial suspensions), as well.

The bicycle 50 includes a frame 52, a front wheel 54, and a rear wheel 56 each rotatably attached to the frame 52, and a drivetrain 58. A front brake 60 is provided for braking the front wheel 54, and a rear brake 62 is provided for braking the rear wheel 56. The bicycle 50 also generally has a seat 64 near a rear end of the frame 52 and carried on an end of a seat tube 66 connected to the frame 52. The bicycle 50 also has handlebars 68 near a forward end of the frame 52. The handlebars 68 are attached to the frame 52 for user, or rider, control of the bicycle 50. A brake lever 70 is carried on the handlebars 68 for actuating one of the front brake 60 or rear brake 62, or both. If the brake lever 70 actuates only the front brake 60 or the rear brake 62, a second brake lever (not shown) may also be provided to actuate the other brake. A front and/or forward riding direction or orientation of the bicycle 50 is indicated by the direction of the arrow A in FIG. 1. As such, a forward direction for the bicycle 50 is indicated by the direction of arrow A.

The drivetrain 58 has a chain C and a front sprocket assembly 72, which is coaxially mounted with a crank assembly 74 having pedals 76. The drivetrain 58 also includes a rear sprocket assembly 78 coaxially mounted with the rear wheel 56 and a rear gear change mechanism, such as a rear derailleur 80.

As is illustrated in FIG. 1, the front sprocket assembly 72 may include one or more coaxially mounted chain rings, gears, or sprockets. In the example of FIG. 1, the front sprocket assembly 72 has two such sprockets F, each having teeth 82 around a respective circumference. The rear sprocket assembly 78 may include a plurality of coaxially mounted gears, cogs, or sprockets G (e.g., eleven). Each sprocket G also has teeth 84 arranged around a respective circumference. The number of teeth 82 on the smaller diameter front sprocket F may be less than the number of teeth 82 on the larger diameter front sprocket F. The number of teeth 84 on the rear sprockets G may gradually decrease from the largest diameter rear sprocket G to the smallest diameter sprocket G.

As shown in FIG. 1, a front gear changer 85 may be operated to move from a first operating position to a second operating position to move the chain C between the front sprockets F. Likewise, the rear derailleur 80 may be operable to move between a number of different operating positions (e.g., eleven operating positions) to switch the chain C to a selected one of the rear sprockets G. In an embodiment, the rear sprocket assembly 78 may have more or fewer sprockets. For example, in an embodiment, a rear sprocket assembly may have twelve or thirteen sprockets. Dimensions and configuration of the rear derailleur 80 may be modified to accommodate a specific implemented plurality of sprockets. For example, an angle and length of the linkage and/or the configuration of the cage of the rear derailleur 80 may be modified to accommodate specific sprocket combinations.

The rear derailleur 80 is depicted in this example as a wireless, electrically actuated rear derailleur mounted or mountable to the frame 52, or frame attachment, of the bicycle 50. The electric rear derailleur 80 has a base member 86 (e.g., a b-knuckle) that is mounted to the bicycle frame 52. A linkage 88 has two links L that are pivotally connected to the base member 86 at a base member linkage connection portion. A movable member 90 (e.g., a p-knuckle) is connected to the linkage 88. A chain guide assembly 92 (e.g., a cage) is configured to engage and maintain tension in the chain and is pivotally connected to a part of the movable member 90. The cage 92 may rotate or pivot about a cage rotation axis in a damping direction and a chain tensioning direction.

A motor module may be carried on the electric rear derailleur 80 and may have a battery. The battery supplies power to the motor module. In one example, the motor module is located in the movable member 90. However, the motor module may instead be located elsewhere, such as in one of the links L of the linkage 88 or in the base member 86. The motor module may include a gear mechanism or transmission. As is known in the art, the motor module and gear mechanism may be coupled with the linkage 88 to laterally move the cage 92 and thus switch the chain C among the rear sprockets on the rear sprocket assembly 78.

The battery may instead be an alternate power supply or power source and may operate other electric components of the bicycle 50 within a linked system. In one example, the battery alone powers all electric components of the bicycle 50 (e.g., a drive motor for an electrically powered bicycle), including the rear derailleur 80. In other examples, multiple power supplies, which may collectively or individually power the electric components of the system, including the rear derailleur 80, may be provided. Additional batteries or other power supplies may be attached to the rear derailleur 80 or located at other positions, such as the frame 52. In this example, however, the battery is configured to be attached directly to the rear derailleur 80, and to provide power to the components of the rear derailleur 80. In an embodiment, the rear derailleur is configured such that the battery provides power to only the components of the rear derailleur 80.

A control device 100 is mounted to the handlebars 68 for, for example, wirelessly actuating the motor module and operating the rear derailleur 80 for executing gear changes and gear selection. Multiple control devices 100 may be used with the bicycle 50. In other embodiments, the control device 100 may be located in other locations on the bicycle 50 or, alternatively, may be distributed among various components of the bicycle 50, with routing of a communication link to accommodate necessary signal and power paths. The control device 100 may also be located in places other than on the bicycle 50, such as, for example, on a rider's wrist or in a jersey pocket. The communication link may include wires, may be wireless, or may be a combination thereof. In one example, the control device 100 may be integrated with the rear derailleur 80 to communicate control commands between components. The control device 100 may include a processor, a communication device (e.g. a wireless communication device), a memory, and one or more communication interfaces.

The control device 100 is configured to actuate or otherwise control components of the bicycle 50. For example, the control device 100 may be configured to control gear shifting of the front gear changer 85 and/or the rear derailleur 80. The control device 100 may also receive and/or send data to one or more components of the bicycle.

Figure 2:
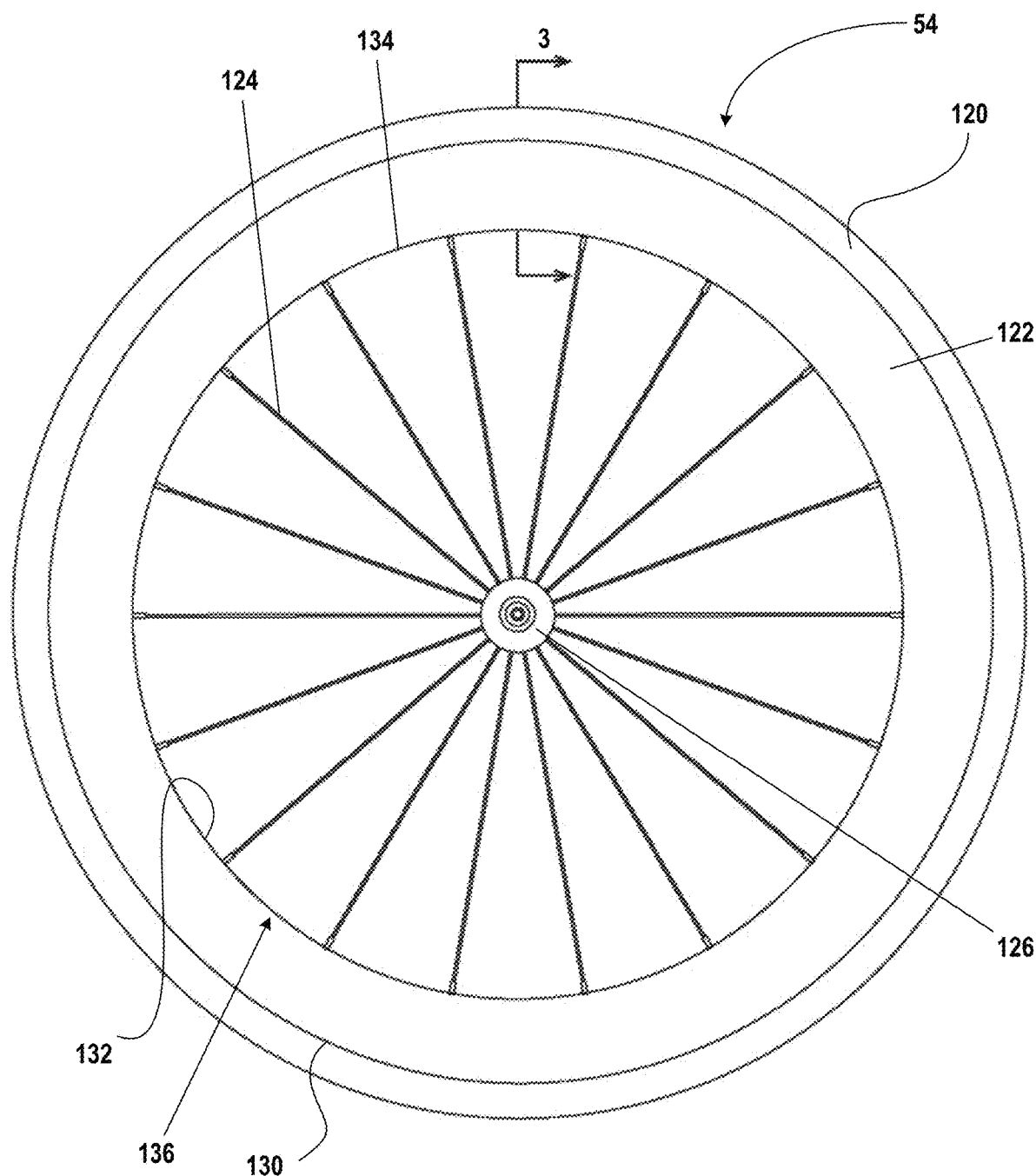
FIG. 2 is a side view of a wheel for a bicycle, such as the bicycle of FIG. 1, with a tire attached.

The front wheel 54 and/or the rear wheel 56 of the bicycle 50 may include a tire 120, attached to a radially outer tire engaging portion of a rim 122. As shown in FIGS. 1-2, a plurality of spokes 124 are attached directly to the rim 122. Alternatively, the spokes 124 may be attached and/or secured to the rim 122 with other structural components. The spokes 124 extend from the rim 122 and attach to a central hub 126. The spokes 124 are maintained with a tension between the rim 122 and the central hub 126 to provide the respective wheel 54, 56 with an operational rigidity for use on the bicycle 50. The central hub 126 is configured for rotational attachment to the bicycle frame 52.

FIG. 2 illustrates a bicycle wheel, such as the front wheel 54 of FIG. 1, having a tire 120, a rim 122, spokes 124, and a central hub 126, removed from the rest of the bicycle 50. The rim 122 includes a tire engaging portion 130 to engage with the tire 120. The tire engaging portion 130 is configured radially outward of a spoke receiving surface 132 that is disposed along an inner circumference 134 of the rim 122. In other words, the tire engaging portion 130 is a radially outer tire engaging portion. The tire engaging portion 130 is configured for attachment to tires using clincher tire attachment configurations for tires including beaded interlock attachments. Other configurations of the tire engaging portion 130 may also be provided to allow for the use of other types of tires on the rim 122.

The rim 122 provides structure for attachment of the spokes 124 to the rim 122 at a receiving portion of the rim 122, proximate to the spoke receiving surface 132. As such, the spoke receiving surface 132 is part of a spoke engaging portion 136 of the rim 122. In an embodiment, the spoke receiving surface 132 and the spoke engaging portion 136 may be separate parts and/or portions of the rim 122. For example, the spokes 124 may pass through the spoke receiving surface 132, and the structure for attachment to the rim 122 may be provided proximate to the tire engaging portion 130. In one example, the rim 122 is formed by carbon-fiber reinforced plastic. The rim 122 may, however, be formed of other materials and/or material combinations.

The front wheel 54 and the rear wheel 56 may include rims 122 configured for any size wheel. In an embodiment, the rims 122 are configured for use in wheels conforming to a 700 C (e.g. a 622 millimeter diameter clincher and/or International Standards Organization 622 mm) bicycle wheel standard.

The front wheel 54 and the rear wheel 56 may rotate about the central hub 126 in either direction. For example, as shown in FIG. 2, the front wheel 54 and the rear wheel 56 may be configured to rotate in a particular rotational direction about the central hub 126. In another example, the front wheel 54 and the rear wheel 56 may be configured to rotate in a direction opposite the particular rotational direction.

FIG. 3A is a cross-section view of a first example of a rim 122, with a tire 120 attached, taken along axis 3 of the wheel of FIG. 2. The rim 122 includes the tire engaging portion 130, the spoke engaging portion 136, and a first sidewall 140 and a second sidewall 142 extending between the tire engaging portion 130 and the spoke engaging portion 136. The first sidewall 140 is spaced apart from the second sidewall 142.

In one example, part of the tire engaging portion 130 (e.g., excluding tire retaining features), the spoke engaging portion 136, the first sidewall 140, and the second sidewall 142 are formed of a single piece construction. The rim 122 may be formed of a single material having thin walls (e.g., layers of composite sheets). At least a portion of the rim 122 may have walls having a constant thickness. In one example, the tire engaging portion 130, the spoke engaging portion 136, the first sidewall 140, and/or the second sidewall 142 is a separate part and attached to the other parts of the rim 122. Specific areas and/or positions of the walls of the rim 122 may be thicker or thinner based on structural requirements of the rim 122.

The radially outer tire engaging portion 130 includes a first tire retaining portion 150 and a second tire retaining portion 152 spaced apart from the first tire retaining portion 150. The first tire retaining portion 150 extends from the first sidewall 140, and the second tire retaining portion 152 extends from the second sidewall 142. The first sidewall 140 and the second sidewall 142 extend radially inward from the radially outer tire engaging portion 130.

The first tire retaining portion 150 includes a first tire retaining wall 154 and a first protrusion 156 (e.g., a first tire retaining feature). The first protrusion 156 extends away from the first tire retaining wall 154, towards the second tire retaining portion 152. The first protrusion 156 may be any number of shapes including, for example, a shape having a cross-section that is rectangular with a semi-circle cap. The first protrusion 156 extends circumferentially around the rim 122.

The second tire retaining portion 152 includes a second tire retaining wall 158 and a second protrusion 160 (e.g., a second tire retaining feature). The second tire retaining wall 158 is opposite and spaced apart from the first tire retaining wall 154. The second protrusion 160 extends away from the second tire retaining wall 158, towards the first tire retaining portion 150. The second protrusion 160 may be any number of shapes including, for example, a shape having a cross-section that is rectangular with a semi-circle cap. The second protrusion 160 extends circumferentially around the rim 122. As discussed below, the first protrusion and the second protrusion may be other shapes.

The tire 120 is, for example, a tubeless clincher tire. The tire 120 includes beads 170 that interact with the radially outer tire engaging portion 130 (e.g., the first tire retaining portion 150 and the second tire retaining portion 152) of the rim 122 to attach the tire 120 to and maintain the tire 120 on the rim 122. The beads 170 may include any number of materials 172 within the beads 170, such as, for example, a steel wire or aramid (e.g., Kevlar™) fiber, to prevent the tire 120 from moving off of the rim 122. Due to the reinforcement with the steel wire or the Kevlar™ fiber 172, for example, the beads 170 resist stretching from internal air pressure. Alternatively, the beads 170 may be made of a same material as the tire 120 (e.g., rubber).

The radially outer tire engaging portion 130 also includes a well 174 positioned between the first tire retaining portion 150 and the second tire retaining portion 152 of the rim 122. The well 174 provides a volume into which the beads 170 of the tire 120 may be placed when the tire 120 is being attached to the rim 122. As the tire 120 is inflated, the beads 170 of the tire 120 move away from each other until the beads 170 interact with the first tire retaining portion 150 and the second tire retaining portion 152, respectively. As shown in FIGS. 3A-3B, when inflated, the beads 170 of the tire 120 abut the first tire retaining wall 154 and the second tire retaining wall 158, respectively. The first tire retaining feature 156 and the second tire retaining feature 160, for example, keep the beads 170 of the tire 120 positioned within the radially outer tire engaging portion 130 (e.g., keep the beads 170 of the tire 120 engaged with the first tire retaining wall 154 and the second tire retaining wall 158) and thus keep the tire 120 from blowing off the rim 122. The contact between the beads 170 and the first tire retaining wall 154 and the second tire retaining wall 158, respectively, forms a seal between the inflated tire 120 and the rim 122.

The radially outer tire engaging portion 130 may also include ridges 176 (e.g., bead bumps; a first bead bump 176*a* and a second bead bump 176*b*) on opposite sides of the well 174, respectively. A first shelf 178 (e.g., a first bead shelf) extends between the first tire retaining wall 154 and the first bead bump 176*a*, and a second shelf 180 (e.g., a second bead shelf) extends between the second tire retaining wall 158 and the second bead bump 176*b*. In one embodiment, curved transition regions 182 extend between the first shelf 178 and the first tire retaining wall 154, and the second shelf 180 and the second tire retaining wall 158, respectively. The bead bumps 176 are positioned on opposite sides of the well 174, respectively, and are raised relative to the first shelf 178 and the second shelf 180, respectively. The bead bumps 176 help retain the tire 120 on the rim 122 if the tire 120 loses pressure.

Referring to FIG. 3B, which is a close-up cross-section of the second tire retaining feature 160, the second tire retaining feature 160 is a separate part from the rest of the rim 122. Opposite the second tire retaining feature 160, as shown in FIG. 3A, the first tire retaining feature 156 is also a separate part from the rest of the rim 122.

The first tire retaining feature 156 and the second tire retaining feature 160 may be made of any number of materials including, for example, Acrylated Urethane, other urethanes, acrylates, maleates, epoxides, a silicone adhesive, vinyl esters, poly/isocyanates, polysiloxanes (e.g., silicone), rubber, a gel, a filament, one or more other materials, or any combination thereof. In one embodiment, the first tire retaining feature 156 and the second tire retaining feature 160 are made of a material (e.g., a first material) different than a material (e.g., a second material) from which the rest of the rim 122 (e.g., the tire engaging portion 130, other than the first retaining feature 156 and the second tire retaining feature 160, the spoke engaging portion 136, the first sidewall 140, and the second sidewall 142) is made. The second material may be any number of materials including, for example, aluminum, titanium, a fiber reinforced plastic (e.g., a carbon fiber reinforced polymer (CFRP) composite), one or more other materials, or any combination thereof.

The first tire retaining feature 156 and the second tire retaining feature 160 may be made of a same material or may be made of one or more different materials. In one embodiment, the first tire retaining feature 156 and/or the second tire retaining feature 160 is made of a same material (e.g., a CFRP composite) as the rest of the rim 122 (e.g., the tire engaging portion 130, other than the first retaining feature 156 and the second tire retaining feature 160, the spoke engaging portion 136, the first sidewall 140, and the second sidewall 142).

In one embodiment, the first tire retaining feature 156 and the second tire retaining feature 160 are made of a material having a different hardness, for example a lower hardness, than a material from which the rest of the rim 122 (e.g., the tire engaging portion 130, other than the first retaining feature 156 and the second tire retaining feature 160, the spoke engaging portion 136, the first sidewall 140, and the second sidewall 142) is made. For example, the first tire retaining feature 156 and the second tire retaining feature 160 are made of a material having a hardness of 30-80 Shore A, such as silicone, and the rest of the rim 122 is made of a material having a hardness greater than 80 Shore D, such as various cured resins or other composite materials. In an embodiment, the rim material is made of a material that in its finished form has a hardness of equal or greater than 80 Shore D and less than or equal to 100 Shore D, whereas the tire retaining feature may be formed of a material having a hardness of less than 80 Shore D.

For example, different resins may be used for the rim material and the tire retaining feature material. In an embodiment the rim resin material may have a cured hardness above 80 Shore D, for example 90 Shore D, and the tire retaining feature resin material may have a cured hardness of less than 80 Shore D, for example 74 Shore D.

The rim material and the tire retaining feature material may be formed of curable materials that are cured using different techniques. For example, the rim material may be a resin that is cured through an application of heat and/or pressure, while the tire retaining feature material, which in one example may be resin or epoxy base materials, may be cured through the application of radiant energy, such as infrared or ultraviolet light, or timed chemical reaction. In such an embodiment, the rim material may be cured first, and the tire retaining feature material may be applied to the cured rim material, and subsequently cured.

The second tire retaining feature 160 is attached (e.g., chemically and/or mechanically) to a surface of the tire engaging portion 130. For example, as shown in FIG. 3B, the second tire retaining feature 160 is attached to the second tire retaining wall 158. As shown in FIG. 3A, the first tire retaining feature 156 is attached (e.g., chemically and/or mechanically) to another surface of the tire engaging portion 130 (e.g., the first tire retaining wall 154). In the embodiment shown in FIGS. 3A-3B, the first tire retaining wall 154 faces the second tire retaining wall 158.

The first tire retaining feature 156 and the second tire retaining feature 160 may be attached to the first tire retaining wall 154 and the second tire retaining wall 158, respectively, in any number of ways. For example, the first tire retaining feature 156 and the second tire retaining feature 160 may be attached to the first tire retaining wall 154 and the second tire retaining wall 158, respectively, with an adhesive. Alternatively, a viscous material (e.g., an epoxy adhesive) may be applied to one or more surfaces of the rim 122 (e.g., the first tire retaining wall 154 and the second tire retaining wall 158), and the viscous material may be cured, such that the viscous material solidifies. The solidified material at, for example, the first tire retaining wall 154 and the second tire retaining wall 158 thus forms the first tire retaining feature 156 and the second tire retaining feature 160, respectively. After solidifying, the material remains adhered to the first tire retaining wall 154 and the second tire retaining wall 158, respectively.

In one embodiment, the first tire retaining feature 156 and the second tire retaining feature 160 are applied to the first tire retaining wall 154 and the second tire retaining wall 158, respectively, using form-in-place and cure-in-place gasketing procedures. These are fast and economic procedures that use a robot to dispense a bead of material within or at a surface (e.g., the first tire retaining wall 154 or the second tire retaining wall 158).

The first tire retaining feature 156 and the second tire retaining feature 160 may be attached to the first tire retaining wall 154 and the second tire retaining wall 158, respectively, at any number of positions along the respective tire retaining wall 154, 158. For example, radially outer edges 184, 186 partially define the first tire retaining wall 154 and the second tire retaining wall 158, respectively. In one embodiment, the first tire retaining feature 156 is positioned at (e.g., flush with) the radially outer edge 184 and extends towards the first shelf 178 and away from the first tire retaining wall 154; the second tire retaining feature 160 is positioned at (e.g., flush with) the radially outer edge 186 and extends towards the second shelf 180 and away from the second tire retaining wall 158. Other positioning of the first tire retaining feature 156 and the second tire retaining feature 160 may be provided.

For example, referring to FIGS. 4A-4B, the first retaining feature 156 and the second retaining feature 160 may extend beyond the radially outer edges 184, 186, respectively. The first tire retaining portion 150 includes a first radially outermost surface 188, and the second tire retaining portion 152 includes a second radially outermost surface 190. The first tire retaining feature 156 and the second tire retaining feature 160 are irregularly shaped and extend beyond the radially outer edges 184, 186, respectively. For example, as shown in FIGS. 4A-4B, the first tire retaining feature 156 extends beyond the radially outer edge 184 and is further attached to the first radially outermost surface 188; the second tire retaining feature 160 extends beyond the radially outer edge 186 and is further attached to the second radially outermost surface 190.

The tire engaging portion 130 may include attachment features that, for example, improve bonding efficacy of the first tire retaining feature 156 and the second tire retaining feature 160. The attachment features and/or the first tire retaining wall 154 and the second tire retaining wall 158 may be mechanically and/or chemically treated for further improvement of bonding efficacy of the first tire retaining feature 156 and the second tire retaining feature 160.

For example, referring to FIGS. 5A and 5B, the first tire retaining wall 154 includes a first attachment feature 192, and the second tire retaining wall 158 includes a second attachment feature 194. In the example shown in FIGS. 5A and 5B, the first attachment feature 192 is a first groove that extends into the first tire retaining wall 154, and the second attachment feature 194 is a second groove that extends into the second tire retaining wall 158. The first groove 192 and the second groove 194 are sized and shaped (e.g., semi-circular) to match a size and a shape of the respective tire retaining feature 156, 160. The first tire retaining feature 156 and the second tire retaining feature 160 are attached to the tire engaging portion 130 of the rim 122 within the first groove 192 and the second groove 194, respectively.

The first tire retaining feature 156 and the second tire retaining feature 160 may be attached to the tire engaging portion 130 at positions spaced apart from the radially outer edges 184, 186, respectively. In other words, the first tire retaining feature 156 and the second tire retaining feature 160 may be attached to the tire engaging portion 130 at positions that are radially inner relative to the radially outer edges 184, 186, respectively.

The embodiment of FIGS. 5A-5B also illustrates another example of a shape of the first tire retaining feature 156 and the second tire retaining feature 160. The cross-section of the first tire retaining feature 156 and the second tire retaining feature 160 is circular in FIGS. 5A-5B.

As another example, referring to FIGS. 6A-6B and FIGS. 7A-7B, the first tire retaining wall 154 includes a first recessed portion 200, and the second tire retaining wall 158 includes a second recessed portion 202. The first recessed portion 200 forms the first attachment feature 192, and the second recessed portion 202 forms the second attachment feature 194. The first recessed portion 200 is partially formed by a first recessed surface 204, and the second recessed portion 202 is partially formed by a second recessed surface 206. The first recessed surface 204 is translationally outer relative to the rest of the first tire retaining wall 154 (e.g., an exposed surface 208 of the first tire retaining wall 154), and the second recessed surface 206 is translationally outer relative to the rest of the second tire retaining wall 158 (e.g., an exposed surface 210 of the second tire retaining wall 158).

The first tire retaining feature 156 is attached to the tire engaging portion 130 at the first recessed portion 200. For example, the first tire retaining feature 156 is attached to the first recessed surface 204. The first tire retaining feature 156 extends away from the first recessed surface 204 and beyond the exposed surface 208 of the first tire retaining wall 154. The second tire retaining feature 160 is attached to the tire engaging portion 130 at the second recessed portion 202. For example, the second tire retaining feature 160 is attached to the second recessed surface 206. The second tire retaining feature 160 extends away from the second recessed surface 206 and beyond the exposed surface 210 of the second tire retaining wall 158.

In one embodiment, the first recessed surface 204 is parallel to the exposed surface 208 of the first tire retaining wall 154, and the second recessed surface 206 is parallel to the exposed surface 210 of the second retaining wall 158. In such a configuration, a depth of the first recessed portion 200 is defined by a distance between the first recessed surface 204 and the exposed surface 208 of the first tire retaining wall 154, and a depth of the second recessed portion 202 is defined by a distance between the second recessed surface 206 and the exposed surface 210 of the second tire retaining wall 158. Any number of depths of the first recessed portion 200 and the second recessed portion 202, respectively, may be provided. Other configurations of the first recessed portion 200 and the second recessed portion 202 may be provided.

Any number of different shaped tire retaining features 156, 160 may be disposed within and attached at the first recessed portion 200 and the second recessed portion 202, respectively. For example, as shown in FIGS. 6A-6B, a cross-section of the first tire retaining feature 156 and the second tire retaining feature 160 may be rectangular with a semi-circle cap. As another example, as shown in FIGS. 7A-7B, a cross-section of the first tire retaining feature 156 and the second tire retaining feature 160 may be more irregular compared to the example shown in FIGS. 6A-6B. The cross-section of the first tire retaining feature 156 and the second tire retaining feature 160 may be sized and shaped to match a shape of the beads 170 of the tire 120 when the tire 120 is attached to the rim 122. Other shapes may be provided.

In other embodiments, the tire engaging portion 130 includes additional recessed portions. For example, as shown in FIGS. 8A-8B, the first tire retaining wall 154 includes a third recessed portion 212, and the second tire retaining wall 158 includes a fourth recessed portion 214. The third recessed portion 212 combined with the first recessed portion 200 forms the first attachment feature 192, and the fourth recessed portion 214 combined with the second recessed portion 202 forms the second attachment feature 194. The third recessed portion 212 is laterally and radially outer relative to the first recessed portion 200, and the fourth recessed portion 214 is laterally and radially outer relative to the second recessed portion 202. The first tire retaining feature 156 is attached to the first tire retaining wall 154 at the first recessed portion 200 and the third recessed portion 212, and the second tire retaining feature 160 is attached to the second tire retaining wall 160 at the second recessed portion 202 and the fourth recessed portion 214. Other configurations may be provided.

In other embodiments, the tire engaging portion 130 includes additional attachment features. For example, as shown in FIGS. 9A-9B, while the first recessed portion 200 forms the first attachment feature 192 and the second recessed portion 202 forms the second attachment feature 194, the tire engaging portion 130 also includes a first channel 220 as a third attachment feature and a second channel 222 as a fourth attachment feature. The first channel 220 extends away from the first recessed portion 200 in a direction parallel to the first recessed surface 204, and the second channel 222 extends away from the second recessed portion 202 in a direction parallel to the second recessed surface 206.

A cross-section of the first tire retaining feature 156 and the second tire retaining feature 160 is, for example, P-shaped. The first tire retaining feature 156 is disposed within the first channel 220 and may be attached to the tire engaging portion 130 at the first channel 220 and/or the first recessed portion 200. The second tire retaining feature 160 is disposed within the second channel 222 and may be attached to the tire engaging portion 130 at the second channel 222 and/or the second recessed portion 202. The embodiment shown in FIGS. 9A-9B is similar to the embodiment shown in FIGS. 6A-6B, with extensions into the first channel 220 and the second channel 222, respectively, for added support for the first tire retaining feature 156 and the second tire retaining feature 160.

The attachment features may take forms other than recesses and channels. For example, as shown in FIGS. 10A-10B, the first attachment feature 192 includes a plurality of first projections 224 extending away from the first tire retaining wall 154, and the second attachment feature 194 includes a plurality of second projections 226 extending away from the second tire retaining wall 158. In the example shown in FIGS. 10A-10B, the plurality of first projections 224 include three triangular projections, and the plurality of second projections 226 include three triangular projections. More, fewer, and/or different shaped (e.g., rectangular) first projections 224 and/or second projections 226 may be provided.

The plurality of first projections 224 and the plurality of second projections 226 are positioned adjacent to the radially outer edges 184, 186, respectively. In different embodiments, the plurality of first projections 224 and the plurality of second projections 226 may be positioned radially inner relative to the radially outer edges 184, 186, respectively.

The plurality of first projections 224 and/or the plurality of second projections 226 may be formed integrally with the tire engaging portion 130. Alternatively, the first projections 224 (e.g., as a group) and/or the second projections 226 (e.g., as a group) may be separate part(s) from the tire engaging portion 130 and may be attached to the tire engaging portion 130 in any number of ways including, for example, with an adhesive.

The first tire retaining feature 156 may be formed directly on the plurality of first projections 224, and the second tire retaining feature 160 may be formed directly on the plurality of second projections 226. Alternatively, the first tire retaining feature 156 and the second tire retaining feature 160 may include grooves into which the plurality of first projections 224 and the plurality of second projections 226 are respectively positioned. The first tire retaining feature 156 and the second tire retaining feature 160 are attached to the tire engaging portion 130 at the plurality of first projections 224 and the plurality of second projections 226, respectively. In one embodiment, the first tire retaining feature 156 and the second tire retaining feature 160 do not include grooves. Instead, the first tire retaining feature 156 and the second tire retaining feature 160 are made of a compliant material, and the plurality of first projections 224 and the plurality of second projections 226 deform the first tire retaining feature 156 and the second tire retaining feature 160, respectively, when the first tire retaining feature 156 and the second tire retaining feature 160 are attached to the tire engaging portion 130 at the plurality of first projections 224 and the plurality of second projections 226, respectively.

In another example, as shown in FIGS. 11A-11B, the first attachment feature 192 includes a plurality of grooves 228 extending into the first tire retaining wall 154, and the second attachment feature 194 includes a plurality of second grooves 230 extending into the second tire retaining wall 158. In the example shown in FIGS. 11A-11B, the plurality of first grooves 228 include three triangular shaped grooves, and the plurality of second grooves 230 include three triangular shaped projections. More, fewer, and/or different shaped (e.g., rectangular) first grooves 228 and/or second grooves 230 may be provided.

The plurality of first grooves 228 and the plurality of second grooves 230 are positioned adjacent to the radially outer edges 184, 186, respectively. In different embodiments, the plurality of first grooves 228 and the plurality of second grooves 230 may be positioned radially inner relative to the radially outer edges 184, 186, respectively.

The first tire retaining feature 156 may be formed directly within the plurality of first grooves 228, and the second tire retaining feature 160 may be formed directly within the plurality of second grooves 230. Alternatively, the first tire retaining feature 156 and the second tire retaining feature 160 may each include projections that are positionable within the plurality of first grooves 228 and the plurality of second grooves 230, respectively. The first tire retaining feature 156 and the second tire retaining feature 160 are attached to the tire engaging portion 130 at the plurality of first grooves 228 and the plurality of second grooves 230, respectively.

FIGS. 12A-12B, FIGS. 13A-13B, and FIGS. 14A-14B illustrate additional embodiments of the tire retaining features 156, 160. Referring to FIGS. 12A-12B, in one embodiment, the first tire retaining feature 156 and the second tire retaining feature 160 are each made of two materials. For example, the first tire retaining feature 156 and the second tire retaining feature 160 are made of the first material 232 and a third material 234 that is different than the first material. The first material 232 surrounds the third material 234. The third material 234 may be a material that has a greater hardness than the first material 232. The third material 234 may be any number of materials including, for example, a CFRP composite.

Referring to FIGS. 13A-13B, each of the first tire retaining feature 156 and the second tire retaining feature 160 includes a housing 240 (e.g., a shell) that houses material fibers 242 (e.g., composite fibers). The housing 240 may be made of a compliant material (e.g., the first material), and the material fibers 242 may increase a tire retaining strength of the tire retaining features 156, 160.

Referring to FIGS. 14A-14B, the first tire retaining feature 156 and the second tire retaining feature 160 may be different shapes than discussed above. For example, as shown in FIGS. 14A-14B, each of the first tire retaining feature 156 and the second tire retaining feature 160 may have a cross-section that is triangular in shape (e.g., a triangle extending from a rectangle). Other tire retaining features having different cross-sectional shapes may be provided.

Additional tire retaining features may also be formed of the second material, different than the first material of the rim. Referring to FIGS. 15A-15B, the first tire retaining feature 156 and the second tire retaining feature 160 may be formed of the second material. Additional tire retaining features, such as the bead bumps 176c and 176d may also be formed of a material, different than the material of the rim. For example, the additional tire retaining features may be formed of the second material of the hooks 156, 160, as it is described herein. In another embodiment, the additional tire retaining features may be formed of a third material. The third material may be different than the material of the hooks 156, 160 and the material of the rim.

Tire retaining features alternative to the hooks 156b, 160b may also be formed of the second material, different than the first material of the rim. Referring to FIGS. 16A-16B, the first tire retaining feature 156b and the second tire retaining feature 160b may be formed of the same material as the rim. Other tire retaining features, such as the bead bumps 176c and 176d may be formed of a material, different than the material of the rim. For example, the additional tire retaining features may be formed of the second material as described herein.

As is illustrated in the embodiments shown in FIGS. 15a, 15b, 16a, 16b the bead hooks 176c and 176d may be formed of a material that is different than the material of the bead shelfs 178, 180 of the tire engagement portion. In an embodiment, the exposed surfaces of the bead hooks 176c and 176d and the bead shelfs 178, 180 of the tire engagement portion may be formed of different materials.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A rim assembly for a bicycle wheel, the rim assembly comprising:
    a rim comprising:
        a radially inner portion disposed along an inner circumference of the rim;
        a first sidewall;
        a second sidewall spaced apart from the first sidewall, wherein the first sidewall and the second sidewall extend radially outward from the radially inner portion; and
        a radially outer tire engaging portion disposed along an outer circumference of the rim and having a first tire retaining portion and a second tire retaining portion spaced apart from the first tire retaining portion, the first tire retaining portion extending from the first sidewall and the second tire retaining portion extending from the second sidewall, wherein the first tire retaining portion includes a first tire retaining wall, and the second tire retaining portion includes a second tire retaining wall opposite the first tire retaining wall;
    a first tire retaining feature attached to a first surface of the rim, the first surface being a surface of the first tire retaining wall; and
    a second tire retaining feature attached to a second surface of the rim, the second surface being a surface of the second tire retaining wall and facing the first surface, the first tire retaining feature and the second tire retaining feature being protrusions that entirely face each other and bulge out from a surrounding or adjacent surface,
    wherein the first tire retaining feature and the second tire retaining feature are made of a first material, and the first tire retaining wall and the second tire retaining wall are made of a second material, the second material being different than the first material.

2. The rim assembly of claim 1, wherein the first material has a different hardness than the second material.

3. The rim assembly of claim 2, wherein the first material is an epoxy adhesive, silicone, rubber, a gel, a filament, or a fiber, and
    wherein the second material is aluminum, titanium, or a fiber reinforced plastic.

4. The rim assembly of claim 1, wherein the first tire retaining feature and the second tire retaining feature are respectively attached to the first surface and the second surface with an adhesive.

5. The rim assembly of claim 1, wherein the first tire retaining feature is attached to the first surface at a radially outer edge of the first tire retaining wall, and the second tire retaining feature is attached to the second surface at a radially outer edge of the second tire retaining wall.

6. The rim assembly of claim 1, wherein the first tire retaining feature is attached to the first surface at a position spaced apart from a radially outer edge of the first tire retaining wall, and the second tire retaining feature is attached to the second surface at a position spaced apart from a radially outer edge of the second tire retaining wall.

7. The rim assembly of claim 1, wherein the first tire retaining wall includes a first attachment feature, and the second tire retaining wall includes a second attachment feature.

8. The rim assembly of claim 7, wherein the first attachment feature includes a first groove that extends from the first surface into the first tire retaining wall and extends around the rim, the first groove being spaced apart from a radially outer edge of the first tire retaining wall,
- wherein the second attachment feature includes a second groove that extends from the second surface into the second tire retaining wall and extends around the rim, the second groove being spaced apart from a radially outer edge of the second retaining wall, and
- wherein the first tire retaining feature is disposed within the first groove, and the second tire retaining feature is disposed within the second groove.

9. The rim assembly of claim 7, wherein the first attachment feature includes a first recessed portion of the rim, the first recessed portion including the first surface,
- wherein the first surface is laterally outer relative to a third surface of the rim, the third surface being another surface of the first tire retaining wall, a depth of the first recessed portion being defined by a distance between the first surface and the third surface,
- wherein the second attachment feature includes a second recessed portion of the rim, the second recessed portion including the second surface, and
- wherein the second surface is laterally outer relative to a fourth surface of the rim, the fourth surface being another surface of the second tire retaining wall, a depth of the second recessed portion being defined by a distance between the second surface and the fourth surface.

10. The rim assembly of claim 9, wherein the first tire retaining feature extends away from the first surface and beyond the third surface, and
- wherein the second tire retaining feature extends away from the second surface and beyond the fourth surface.

11. The rim assembly of claim 9, wherein the first attachment feature includes a third recessed portion of the rim, the third recessed portion being laterally outer relative to the first surface,
- wherein the second attachment feature includes a fourth recessed portion of the rim, the fourth recessed portion being laterally outer relative to the second surface, and
- wherein the first tire retaining feature is also attached to the first tire retaining wall at the third recessed portion, and the second tire retaining feature is also attached to the second tire retaining wall at the fourth recessed portion.

12. The rim assembly of claim 7, wherein the first attachment feature includes a plurality of first projections extending away from the first surface, and the second attachment feature includes a plurality of second projections extending away from the second surface; or
- the first attachment feature includes a plurality of first grooves extending from the first surface into the first tire retaining wall, and the second attachment feature includes a plurality of second grooves extending from the second surface into the second tire retaining wall.

13. The rim assembly of claim 12, wherein the first tire retaining feature is attached to the first surface at the plurality of first projections or the plurality of first grooves, and
- wherein the second tire retaining feature is attached to the second surface at the plurality of second projections or the plurality of second grooves.

14. The rim assembly of claim 1, wherein the first tire retaining feature is also attached to a radially outermost surface of the first tire retaining portion, and the second tire retaining feature is also attached to a radially outermost surface of the second tire retaining portion.

15. The rim assembly of claim 1, wherein the first tire retaining feature and the second tire retaining feature are also made of a third material, the third material being different than the first material, the first material surrounding the third material.

16. The rim assembly of claim 1, wherein at least part of the first tire retaining wall and at least part of the second tire retaining wall are exposed wall surfaces, respectively.

17. A wheel for a bicycle, the wheel comprising:
- a central hub configured for rotational attachment to the bicycle;
- a plurality of spokes attached to the central hub and extending radially outward from the hub, the plurality of spokes consisting of a number of spokes; and
- a rim comprising:
  - a radially outer tire engaging portion having a first tire retaining portion and a second tire retaining portion spaced apart from the first tire retaining portion, wherein the first tire retaining portion includes a first tire retaining wall, and the second tire retaining portion includes a second tire retaining wall opposite the first tire retaining wall;
  - a first sidewall, the first tire retaining portion extending from the first sidewall;
  - a second sidewall spaced apart from the first sidewall, the second tire retaining portion extending from the second sidewall, the first sidewall and the second sidewall extending radially inward of the radially outer tire engaging portion;
  - a radially inner portion disposed along an inner circumference of the rim, the plurality of spokes being attached to the radially inner portion of the rim, the first sidewall and the second sidewall extending radially outward from the radially inner portion;
  - a first tire retaining feature attached to a first surface of the rim, the first surface being a surface of the first tire retaining wall; and
  - a second tire retaining feature attached to a second surface of the rim, the second surface being a surface of the second tire retaining wall and facing the first surface, the first tire retaining feature and the second tire retaining feature being protrusions that entirely face each other and bulge out from a surrounding or adjacent surface,
- wherein the first tire retaining feature and the second tire retaining feature are made of a first material, and the first tire retaining wall and the second tire retaining wall are made of a second material.

18. The wheel of claim 17, wherein the first material has a lower hardness than the second material.

19. The wheel of claim 17, wherein the first tire retaining wall includes a first attachment feature, and the second tire retaining wall includes a second attachment feature,
- wherein the first attachment feature includes a first recessed portion of the rim, the first recessed portion including the first surface,
- wherein the first surface is laterally outer relative to a third surface of the rim, the third surface being another surface of the first tire retaining wall, a depth of the first recessed portion being defined by a distance between the first surface and the third surface,
- wherein the second attachment feature includes a second recessed portion of the rim, the second recessed portion including the second surface, and
- wherein the second surface is laterally outer relative to a fourth surface of the rim, the fourth surface being another surface of the second tire retaining wall, a depth of the second recessed portion being defined by a distance between the second surface and the fourth surface.

20. A rim comprising:

a radially inner portion disposed along an inner circumference of the rim;

a first sidewall;

a second sidewall spaced apart from the first sidewall, wherein the first sidewall and the second sidewall extend radially outward from the radially inner portion; and a radially outer tire engaging portion disposed along an outer circumference of the rim and having a first tire retaining portion and a second tire retaining portion spaced apart from the first tire retaining portion, the first tire retaining portion extending from the first sidewall and the second tire retaining portion extending from the second sidewall, wherein the first tire retaining portion includes a first tire retaining wall, and the second tire retaining portion includes a second tire retaining wall opposite the first tire retaining wall;

a first tire retaining feature attached to a portion of a surface of the first tire retaining wall; and a second tire retaining feature attached to a portion of a surface of the second tire retaining wall, the first tire retaining feature and the second tire retaining feature being protrusions that entirely face each other and bulge out from a surrounding or adjacent surface, and the surface of the second tire retaining wall facing the surface of the first tire retaining wall.

* * * * *